(12) United States Patent
Fakunle et al.

(10) Patent No.: US 7,467,928 B2
(45) Date of Patent: Dec. 23, 2008

(54) MICROFLUIDIC DEVICE UTILIZING MAGNETOHYDRODYNAMICS AND METHOD FOR FABRICATION THEREOF

(75) Inventors: Eyitayo S. O. Fakunle, San Diego, CA (US); Prabhu U Arumugam, Sunnyvale, CA (US); Ingrid Fritsch, Fayetteville, AR (US); Jeffrey Elbert Mincy, Fayetteville, AR (US); Fred D. Barlow, III, Moscow, ID (US); Gangqiang Wang, Fayetteville, AR (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 106 days.

(21) Appl. No.: 11/609,236

(22) Filed: Dec. 11, 2006

(65) Prior Publication Data
US 2007/0086898 A1 Apr. 19, 2007

Related U.S. Application Data

(62) Division of application No. 10/317,777, filed on Dec. 12, 2002, now Pat. No. 7,147,441.

(51) Int. Cl.
*F04B 37/02* (2006.01)
(52) U.S. Cl. .................... 417/48; 417/53; 422/100; 156/89.11
(58) Field of Classification Search ............... 417/44, 417/45, 48–50, 53; 422/100; 156/89.11
See application file for complete search history.

(56) References Cited

U.S. PATENT DOCUMENTS

| | | | | |
|---|---|---|---|---|
| 5,893,954 A * | 4/1999 | Nanataki et al. | ......... | 156/89.11 |
| 5,897,723 A * | 4/1999 | Tatumoto et al. | ......... | 156/89.11 |
| 5,985,119 A * | 11/1999 | Zanzucchi et al. | .......... | 204/450 |
| 5,997,671 A * | 12/1999 | Takeuchi et al. | ......... | 156/89.11 |
| 6,120,708 A * | 9/2000 | Ohshita et al. | .............. | 252/511 |
| 6,171,420 B1 * | 1/2001 | Takahashi et al. | ......... | 156/89.11 |
| 6,572,830 B1 * | 6/2003 | Burdon et al. | ......... | 422/186.29 |
| 6,875,402 B2 * | 4/2005 | Hirota et al. | ................. | 422/100 |
| 7,160,512 B2 * | 1/2007 | Hirota et al. | ................. | 422/100 |
| 2002/0026978 A1 * | 3/2002 | Harada et al. | ............ | 156/89.11 |
| 2003/0235504 A1 * | 12/2003 | Lemoff et al. | ................. | 417/50 |
| 2005/0051253 A1 * | 3/2005 | Tosa et al. | ................. | 156/89.11 |
| 2005/0194084 A1 * | 9/2005 | Yoshida et al. | ........... | 156/89.11 |
| 2006/0096693 A1 * | 5/2006 | Murosawa et al. | ....... | 156/89.12 |
| 2006/0130956 A1 * | 6/2006 | White et al. | ............. | 156/89.11 |
| 2006/0213602 A1 * | 9/2006 | Yoshida et al. | ........... | 156/89.12 |
| 2007/0214865 A1 * | 9/2007 | Nakae et al. | ................ | 73/19.01 |

\* cited by examiner

*Primary Examiner*—William H Rodriguez
(74) *Attorney, Agent, or Firm*—Head, Johnson & Kachigian, P.C.

(57) ABSTRACT

Microfluidic channels utilizing magnetohydrodynamics are used to pump very small volumes of solution. The channels have electrodes along the walls and a current carrying species within a solution carries current through the solution. The combination of the electric and magnetic fields causes the solution to flow through the channel.

39 Claims, 13 Drawing Sheets

MICROFLUIDIC DEVICE UTILIZING MAGNETOHYDRODYNAMICS AND METHOD FOR FABRICATION THEREOF

CROSS-REFERENCE TO RELATED APPLICATIONS

This application is a divisional of U.S. patent application Ser. No. 10/317,777, filed Dec. 12, 2002 now U.S. Pat. No. 7,147,441 and claims priority to U.S. patent application Ser. No. 10/026,748, now U.S. Pat. No. 6,733,244, filed Dec. 19, 2001 and claims priority to U.S. Provisional Application Ser. No. 60/257,331, filed Dec. 20, 2000 and claims priority to U.S. Provisional Application Ser. No. 60/278,275, filed Mar. 22, 2001 and claims priority to U.S. patent application Ser. No. 10/252,342, filed Sep. 23, 2002.

BACKGROUND OF THE INVENTION

1. Field of the Invention

The present invention relates to microfluidic devices. In particular, the present invention relates to the use of magnetohydrodynamics to propel or mix fluids within microfluidic structures.

2. Prior Art

The field of microfluidics is growing rapidly. There is a strong desire to miniaturize chemical assays. A number of various technologies are currently being developed in an effort to develop what has become known as lab-on-a-chip (LOC) technology. It is believed that these technologies will lead to mobile, small scale chemical testing devices. Such devices would have a variety of applications. Emergency Medical Technicians and military medics could use such devices to rapidly analyze a person's blood chemistry. Forensic scientists could perform DNA analysis at a crime scene, instead of waiting hours or days for results from a laboratory. Realizing the great potential of such devices, there have been many attempts to find a low power method of accurately propelling extremely small liquid samples through microfluidic structures. The desired width of these channels is less than 1 mm, preferably 500 micrometers or less, preferably 100 micrometers or less.

Some of the characteristics sought in a microfluidic propulsion system include high fluid flow rates, the ability to change direction of the flow, minimal power requirements and the ability to effectively propel a wide variety of fluids through structures composed of a wide variety of solid materials. High fluid flow becomes more difficult as microfluidic structures become smaller. This is due to increased drag created by moving along the walls of the microfluidic structure. A small power requirement is desired so that devices may be compact and portable. Different microfluidic technologies have advantages and disadvantages in these areas.

It has been found that by forming a gradient of a hydrophobic film across a glass or silica plate, water droplets can be induced to travel along the gradient. However, this method has only achieved relatively slow flow rates. In addition it is difficult to scale down to the microfluidic level of less than 500 micrometers. Hydrophobic films tend to work best on relatively large water droplets. It is impossible to change flow direction and is only effective on aqueous solutions.

There has been some experimentation in using temperature gradients to propel water through small channels. Although flow is reversible, flow rate is very slow. This technique also requires a relatively large power supply.

Electrokinetics has been a popular field of study in microfluidics. It provides for easy change of flow direction and is suitable for very small channels. It is also well suited for separating chemicals. However, electrokinetics suffers from disadvantages. It is very sensitive to the chemical properties of both the fluid being manipulated and the walls of the channel. In addition, this technology requires high voltage and can only achieve relatively slow flow rates. Electrokinetics also will not work in the presence of air bubbles, which are common in microfluidic systems. Another disadvantage is that electrokinetics is ineffective on organic fluids. Like hydrophobic films, this method only works well on aqueous solutions. Application of a strong current may also alter chemicals present in the solution, thereby decreasing the accuracy of any analyses.

Mechanical methods of pumping fluids through microstructures also pose several problems. The mechanical methods usually require valves which can complicate fabrication and become clogged. Complex mechanical devices, including many valves, are difficult to scale down to small sizes. In addition, mechanical pumping usually requires a pulsating flow and it does not conveniently allow changes in flow direction.

Centrifugation is inexpensive and adaptable to a wide range of channel sizes. However, the flow direction cannot be reversed and this process usually involves a single-use cartridge. Centrifugation also requires a large power supply. These power requirements rapidly increase and the microfluidic structure size decreases due to drag.

There is a need for alternative non-mechanical pumping systems that are lower power, operate with a wider range of device materials and solutions compositions, offer multi-use capabilities, and allow easy change in flow direction.

Magnetohydrodynamics (MHD) has been proposed as an alternative method for microfluidic propulsion. This technology involves the application of a magnetic field and a electric field. The two fields are applied perpendicular to each other and perpendicular to the desired direction of flow. These fields induce fluid flow perpendicular to both fields. This is known as a Lorentz force. On larger scales, the Lorentz force is too weak for any practical applications and until recently has been considered only a curious phenomenon.

MHD works best when current density is high, and most electrodes have fairly low current density. However, because of the physics unique to small scale diffusion, microelectrodes exhibit very high current densities. MHD is therefore much more practical at very small scales. Relatively little power, less than one volt, can achieve high flow rates in microfluidic structures.

MHD is very susceptible to change of flow direction. By simply alternating the electrodes, the direction of fluid flow reverses. Similarly, reversing the magnetic field will also reverse flow direction. The ease of change in flow direction coupled with low power and high flow rate make MHD an excellent mechanism for microfluidic propulsion. In addition, Lorentz forces apply to all fluids, so that MHD may effectively propel both aqueous and organic solutions. MHD is also unaffected by the materials used to construct microfluidic structures.

There have been limited attempts to apply MHD technology to microfluidics already. It has been used successfully on molten metals and mercury. However, these generally involve high temperatures and are not well suited to be used in conjunction with chemical assays. These methods have high power requirements and chemical assays are generally not designed to utilize molten metals.

More recently, attempts have been made to apply MHD to aqueous solutions. Channels have been constructed having electrodes on opposing walls. A magnetic field is then applied perpendicular to both the direction of flow and the electric field generated by the electrodes. Unfortunately, a significant problem has arisen due to water electrolysis. Although insignificant on larger scales, bubbles formed by water electrolysis within a microstructure pose serious problems. Aside from blocking fluid flow, they also disrupt the electric field. This in turn disrupts the Lorentz forces and halts fluid flow completely. Only very low voltage, which results in very slow flow rates, have been shown to be practical. At higher voltages, water electrolysis makes MHD impossible. In addition, MHD is ineffective when applied to hydrophobic, oily solutions that have dielectric points greater than that of water.

There have been attempts to use an alternating current in conjunction with a synchronous alternating magnetic field to counteract the electrolysis of water. By constantly reversing the fields, bubble formation is reduced. Unfortunately, this only provides for a minimal increase in voltage and flow before electrolysis occurs. In addition it is much more difficult to perform. It requires precise shifts in the electric and magnetic fields, otherwise the fluid does not flow at all.

It is therefore desirable to provide a microfluidic propulsion technique that requires relatively little power.

It is also desirable to provide a microfluidic propulsion technique that utilizes a constant magnetic field.

It is also desirable to provide a microfluidic propulsion technique that may be used on a variety of fluids, specifically aqueous and hydrophobic solutions and structures.

It is also desirable to provide a microfluidic propulsion technique that does not induce water electrolysis.

SUMMARY OF THE INVENTION

Figure 1:
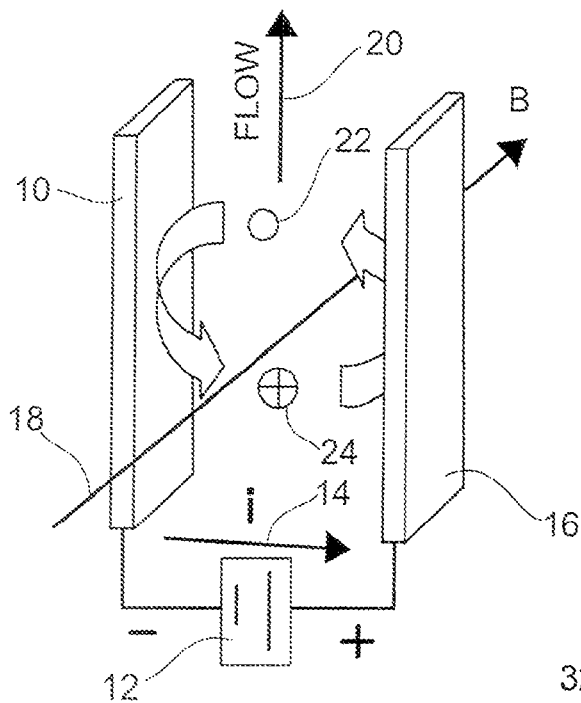
FIG. 1 shows a schematic diagram of a magnetohydrodynamic device.

The invention disclosed here is a new method of microfluidic propulsion and a set of devices that promises to solve many of the problems that other existing microfluidic methods suffer from. This new approach is capable of moving small volumes of fluids through a channel, in either direction, without valves. These devices may be constructed from a variety of materials and use voltages that are in the millivolt to volt range. In addition, this invention utilizes relatively small, constant magnetic fields that can be provided by small permanent magnets. The method disclosed is effective on extremely small samples, less than 100 picoliters. MHD is also a readily reversible method of pumping. These characteristics make this invention especially suitable for use in LOC technology. It may be used for chemical analysis of very small samples, such as those common in forensics, DNA and medical testing.

In order to avoid water electrolysis, chemicals that are highly susceptible to reduction/oxidation are added to the solution prior to its addition to the microfluidic system. These reduction/oxidation (redox) chemicals serve as "ferries" transporting electrons from the anode to the cathode. Once oxidized at the cathode, they return to the anode where they are once again reduced. This cycle is repeated many times. By using redox chemicals in the fluid as electron transporters, electrolysis of water is avoided. The redox species in the solution are propelled in a direction perpendicular to both the electric and magnetic fields. This movement of the redox species causes the entire solution to flow in the same direction. This constitutes a significant improvement over existing microfluidic technology.

In addition to redox species, other current carrying species may be used. Metallic nanoparticles may be added to the solution in order to accomplish the same motion as redox compounds. The nanoparticles ferry electrons, thereby allowing current to flow through the solution. This is necessary for the Lorentz forces to take effect. The movement of nanoparticles causes the entire solution to move.

Mixing is generally difficult with extremely small volumes. Sample preparation and assays, such as immunoassays and DNA analysis, involve combining of reagents in very small amounts. Small samples pose challenging problems in analyzing their content, since signal of small volumes is generally small or requires special equipment to achieve high sensitivity. Some chemical detection methods, such as electrochemical detection, have a signal that depends on how fast the molecular species move past the detector or a modified surface which captures the analyte. The inability to mix extremely small volumes allows diffusion to predominate and significantly reduces the accuracy of small sample analysis. The invention disclosed herein allows mixing of such small samples and can significantly improve the accuracy of small sample analysis. Methods of mixing extremely small samples have eluded scientists for years. In the present invention, relatively high concentration of current carrying species, such as redox chemicals, nanoparticles, or the like are usually used. This guarantees the inhibition of water electrolysis. The current carrying species carries the entire current. This also rapidly and effectively mixes samples as small as a hundred picoliters. The rapid movement of the redox species or nanoparticles mixes the solution.

Another advantage provided by the present invention is that a wide variety of redox chemicals may be used. It may be desirable to use MHD microfluidic technology to analyze chemicals that react with various redox compounds. In such situations, a different, non-reactive redox chemical, nanoparticle or the like may be employed instead without any adverse effects. This ability to choose from a wide range of suitable current carrying species makes the present invention more practical and more adaptable than other microfluidic pumping methods. It is also possible that small scale, portable LOC devices may be exposed to various extreme conditions. Some conditions such as extreme pressures, heat or cold may have an adverse effect on certain redox chemicals. Again, in these situations specific redox chemicals may be employed that best suit a given situation.

The present invention also allows the pumping action of the MHD microfluidics channel to be separated from the analyte solution. A hydrophobic solution having a current carrying species may be used to push an aqueous solution through a microfluidic channel. The two solutions will not mix together. This provides many advantages. Many analytes may react with redox species or nanoparticles to form different compounds. This will decrease the accuracy of any measurements of the analyte. Current carrying species may disrupt the method of detection of the analyte, causing false positives or false negatives. By separating the analyte solution from the pumping solution, the analyte remains unaffected.

In the present invention, a small channel is formed through which the fluid flows. To avoid evaporation, the channel is enclosed on four sides. Two opposing sides consist of electrodes. It is usually desirable that these electrodes be switched, so that each alternates between being a cathode and an anode allowing direction of flow to reverse. A magnetic field passes through the two remaining walls, perpendicular to the electric field created by the electrodes. A solution having a current carrying species is introduced to the channel. Lorentz forces affect the current carrying species, propelling them in a direction perpendicular to both the electric and magnetic fields. The current carrying species in turn causes the solution to move through the channel.

The magnetohydrodynamic microfluidic systems disclosed herein are especially suited for the formation of microfluidic assay structures that allow the performance of chemical detection assays within very small chips. Reduction/oxidation assays, ELISA's polynucleotide hybridizations and other immobilization assays may all be performed within microfluidic assay structures. These assays, because of their electrochemical nature and small volume, are fast, reliable, sensitive and easily transported.

It is therefore an object of the present invention to provide an effective method of microfluidic pumping.

It is another object of the present invention to provide a method of using (MHD) technology to pump microfluidic samples without inducing water electrolysis.

It is another object of the present invention to provide a method of rapidly and effectively mixing extremely small samples. It is another object of the present invention to provide a method of pumping microfluidic samples that is effective for a wide variety of sample solutions.

FEATURES OF MICROFLUIDICS

| Feature | Electro-kinetic | Mechanical | Centrifugal | Magnetohydrodynamic |
|---|---|---|---|---|
| Flow and Profile | Limited (slow) & flat | Variable & non-flat | Variable & non-flat | Variable (slow) & non-flat |
| Reversible Direction | Yes | Yes (valves, pushed) | No | Yes |
| Voltage & Power | High (100's to 10000's V) | For pump devices | For Spinning | 0.01 V to 1 V |
| Versatile Materials and Solvents | No | Yes | Yes | Yes |
| Easy to Miniaturize, low complexity | Yes (device) No (power) | no (moving parts, valves | No (moving parts, detection) | Yes (battery) |

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

MHD Lorentz forces have been known to physicists for almost 200 years. It involves 3 physical fields all perpendicular to one another. The flow or velocity field is aligned perpendicular to both the magnetic and electric fields which are also perpendicular to one another. Manipulation of any two of these fields results in a change in the third one. In the present invention, an electric field and a magnetic field are applied to a channel both being perpendicular to the desired direction of flow.

MHD technology requires a relatively dense current in order to induce a significant rate of flow through the channel. At larger scales this is not practical. Small scale, microfluidic channels however, because of the unique properties associated with microelectrodes in close proximity to one another, allow for relatively high current densities. These may be combined with natural magnets. Magnetic fields on 0.4T or less may be adequate. Because natural magnets and a low amount of electricity are all that is required, MHD technology is especially well suited for LOC.

Microfluidic MHD channels may be constructed from a variety of materials. Channels formed from ceramic tape and glass slides are discussed in detail below. However, any substrates susceptible to microfabrication are suitable.

The current carrying species may be any chemical compound capable of readily acquiring and releasing one or more electrons. Those skilled in the art of chemistry will recognize that there are a large number of chemical compounds, generally known as redox compounds or species, that would serve as adequate current carrying species. Two common examples of well known redox compounds are ferricyanide and hydroquinone. Also, small particles, called nanoparticles, may serve as adequate current carrying species. Nanoparticles may be comprised of metals, carbon fibers, conductive plastics or the like. Depending on the solution to which they are added, redox species or nanoparticles may be hydrophobic, hydrophilic or amphoteric.

FIG. 1 illustrates the principles by which the present invention operates. Electrodes 10 and 16 are connected to an electrical power source 12. Electrode 16 works as a cathode while electrode 10 works as an anode. This creates an electrical field represented by directional arrow 14. Natural magnets, not shown in this drawing, are used to apply a magnetic field represented by directional arrow 18. The magnetic field is applied perpendicular to the electric field. Current between cathode 16 and anode 10 is carried by a current carrying species 22. Current carrying species 22 acquires an electron from anode 10 and is transformed into the reduced form of species 24. The reduced species 24 then carries the electron to cathode 16 where it discharges it and transforms into the oxidized species 22. This process is repeated many times. Electric field 14 created by the redox cycling of the current carrying species, in conjunction with the magnetic field, induces flow of the current carrying species in the direction of directional arrow 20. The flow induced within the current carrying species is transferred to the entire solution located between the electrodes.

Figure 2:
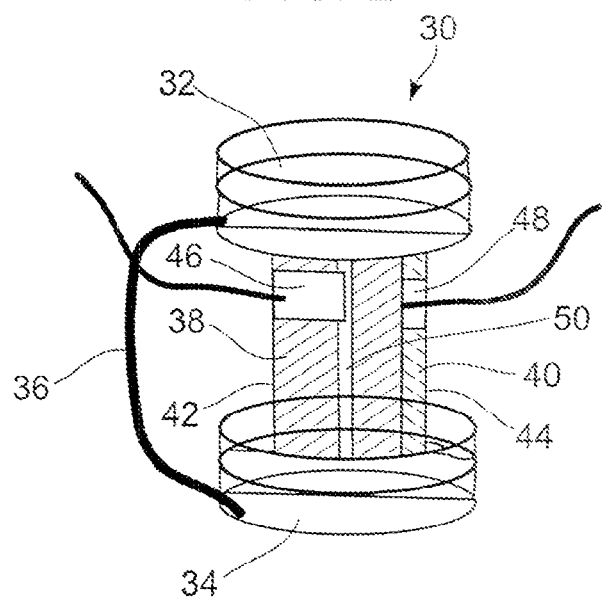
FIG. 2 shows a schematic diagram of an alternative magnetohydrodynamic device formed on a glass substrate.
Figure 3:
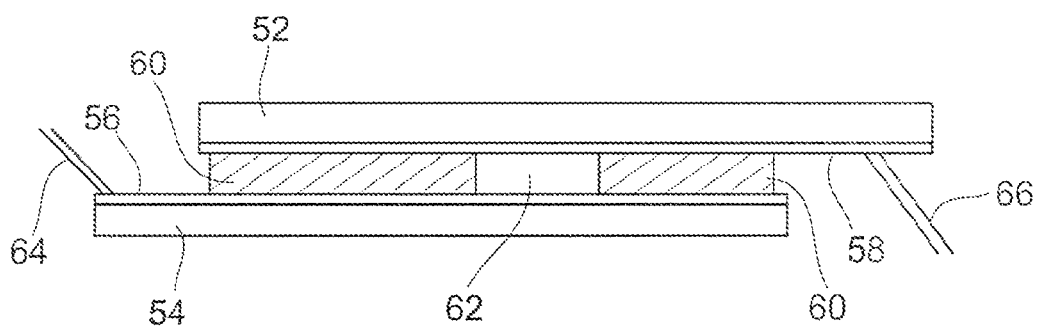
FIG. 3 shows a cross-sectional view of the schematic diagram of FIG. 2.

FIGS. 2 and 3 illustrate a MHD channel formed between 2 glass slides. To form this microchannel, an electrode is first deposited on each glass slide. An insulating material is then used to form a channel on one slide and then the second slide is attached. The slides are positioned in such a way that the electrodes deposited each run along a wall of the channel. Reservoirs are then placed at each end of the channel, a magnetic field is applied, and current is sent through the electrodes. A current carrying species within the solution carries the current and creates an MHD effect. In FIG. 2 MHD device 30 has an upper reservoir 32 and a lower reservoir 34. Lower reservoir 34 is sealed so that it is air tight and is connected to upper reservoir 32 by pressure equalizing tube 36. As solution is transferred to upper reservoir 32, a partial vacuum is created in lower reservoir 34, making it more difficult for the device to draw solution out of reservoir 34. Equalizing tube 36 relieves this vacuum pressure.

Class slides 42 and 44 have electrodes 46 and 48 respectively. Electrodes 46 and 48 are on the sides of slides 42 and 44 that face each other. This way electrodes 46 and 48 lie along 2 opposite walls of the channel. Insulating material 38 and 40 lie between slides 42 and 44, and adhere to each of them. Insulating material 38 and 40 may be comprised of any of a number of materials. Polydimethylsiloxane (PDMS) elastomer, polyimide and various photo resists may all be used. It is also possible to use double sided adhesive tape for the insulating material.

FIG. 3 shows a cross sectional view of an MHD channel formed by the following process:

Device Fabrication Procedure

Electrode Fabrication
1. Glass microscope slides are piranha cleaned for 30 minutes then rinsed thoroughly with water.
2. Deposit a 100 Å chromium adhesion layer, then 6000 Å of gold on a glass microscope slide using a thermal evaporator.
3. Coat the deposited glass slides with approximately 1.5 mL of HPR-504 positive photoresist.
4. Spin coat the slides for 20 seconds at 2000 rpm.
5. Bake the slides for 9 minutes at 103° C. on top of petri dishes.
6. Place the electrode photoplot film ink-side down on top of the deposited slide and place another slide on top of the film.
7. Expose slides to UV light for 30 seconds for each half of the slide (1 minute total).
8. Develop the exposed slide for 1 minute in a 50:50 solution of water:developer solution.
9. Place the slides in Aqua Regia (3:1 HCl:$HNO_3$) for 3-4 minutes or until the gold is etched away. Rinse with water.
10. Place the slides in a Chromium Etch agent for 1 minute, or until all of the chromium has been etched away. Rinse with water.
11. Rinse all remaining photoresist away with acetone and rinse with water.

The pattern from the electrode film should now be transferred onto the glass slide.

Channel Mold Fabrication
1. A silicon wafer is piranha cleaned for 30 minutes then rinsed thoroughly with water.
2. Coat the wafer with SU-8 25 (Microchem Corp), a negative photoresist.
3. Spin coat the wafer for 30 seconds at 2000 rpm.
4. Soft bake the wafer to 5 minutes at 95° C.
5. Place the channel film ink-side down on top of the wafer and place a microscope slide on top of the film.
6. Expose the wafer for 5 minutes.
7. Hard bake the wafer to 15 minutes at 95° C.
8. Develop the exposed wafer to 3 minutes (1 minute of agitation and soaking for 2 minutes) in SU-8 Developer.
9. Spray with fresh developer.
10. Bake at 60° C. until dry.

The mold should be hard.

Transferring Channel to Electrode Slide
1. Mix polydimenthylsiloxane (PDMS) elastomer and curing agent (10:1 by weight) thoroughly.
2. Degas mixture for 10-30 minutes.
3. Pour mixture on top of channel mold.
4. Press electrode slide firmly against the channel mold.
5. Bake for 1-3 hours at 60° C. until cured.

6. Peel the electrode slide and the channel mold wafer apart. The PDMS should adhere to the glass electrode slide, thereby transferring the channel design onto the electrode slide.
7. Clear the residual PDMS out of the channels using a sharp object (i.e. razor blade).
8. Piranha clean the electrode slide with the PDMS and another electrode slide (which has holes drilled in it for the reservoirs) for 15 minutes and rinse thoroughly with water.
9. Immediately rinse both slides with methanol and press them together (gold sides facing each other).
10. Bake at 65° C. until methanol is completely dry. The two slides should now be joined together.

This process creates the sandwich arrangement in FIG. 3. In the particular embodiment described above, glass slides 52 and 54 are used as the beginning substrate. However, any substrate susceptible to any process of depositing layers of conducting material may be used. Oxidized silicon wafers and polyimide films are examples of other suitable substrates.

The channel formed by this process may be as little as 12 microns wide and 12 microns long. However, it is also possible to form channels 12 microns wide and several millimeters long. This process allows the formation of a structure having several channels in a variety of designs.

Also in this embodiment, thermal evaporation is used to deposit gold electrodes 58 and 56 onto slides 52 and 54 respectively. However, those skilled in the art will appreciate that there are a variety of methods for depositing these electrodes. Electron beam evaporation, sputtering deposition, spin coating, molecular beam epitaxy or the like are suitable alternatives to thermal evaporation. The preferred method of deposition will depend on the type of substrate used, the use to which the MHD device is to be put, the desired characteristics of the MHD device and other factors known to those skilled in the art.

Those skilled in the art will also appreciate that gold is only one of many suitable materials for the conducting layer. Other metals such as copper and aluminum are suitable for use as electrodes. It may also be desirable to use non-metallic conductors, such as carbon fibers for the electrode layer.

Insulating layer 60 is sandwiched between slides 52 and slides 54 in order to form channel 62. Slides 52 and 54 are positioned such that electrodes 58 and 56 face one another. Slides 52 and 54 are off set from one another to facilitate attachment of conducting wire 64 and 66 that lead to an electrical current source. In this particular embodiment, PDMS is used as the insulating layer. This layer may be as thin or as thick as desired. The only limit on the thickness of the layer is that it must be thick enough to prevent shorting between electrodes 58 and 56.

Figure 4A:
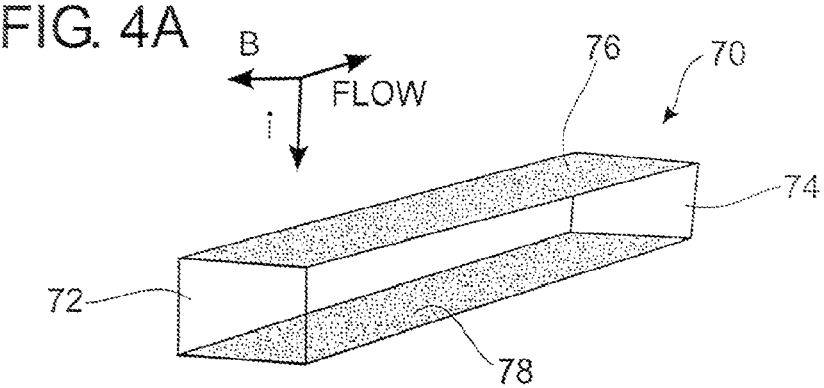
FIG. 4A shows a perspective view of a magnetohydrodynamic channel.

FIGS. 4A, 4B, 4C and 4D all show alternative designs for a MHD channel. In FIG. 4A, general MHD channel 70 has a basic design. Anode 76 comprises 1 of 4 walls of the channel. Cathode 78 comprises the opposite wall of channel 70. Side walls 72 and 74 are comprised of an insulating material. FIG. 4A illustrates the simplest design where anode 76 and cathode 78 each comprise an entire wall of the channel.

Figure 4B:
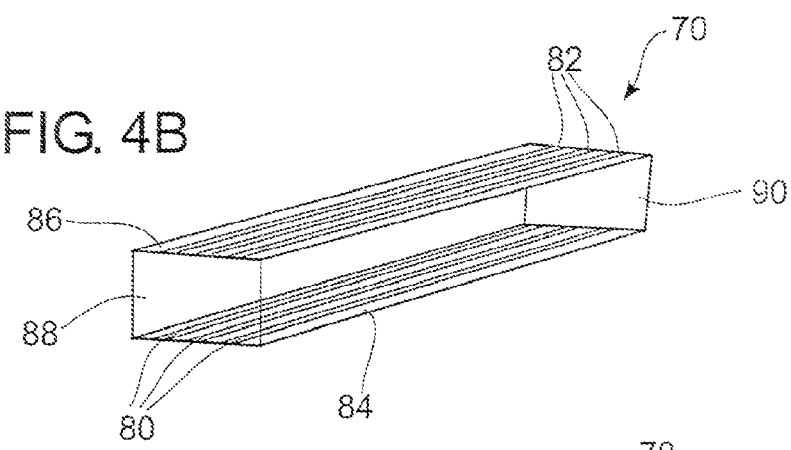
FIG. 4B shows a perspective view of an alternative magnetohydrodynamic channel.

FIG. 4B illustrates a more complex design for channel 70. In this embodiment, wall 86 has a series of anode bands 92 running down the length of the wall. Here there are 3 anode bands 92 but this number may vary. Similarly, wall 84 has a series of cathode bands 80 running along its length. Preferably there are the same number of anode bands 92 and cathode bands 80. However, this is not necessary. Side walls 88 and 90 are comprised of insulating materials.

Figure 4C:
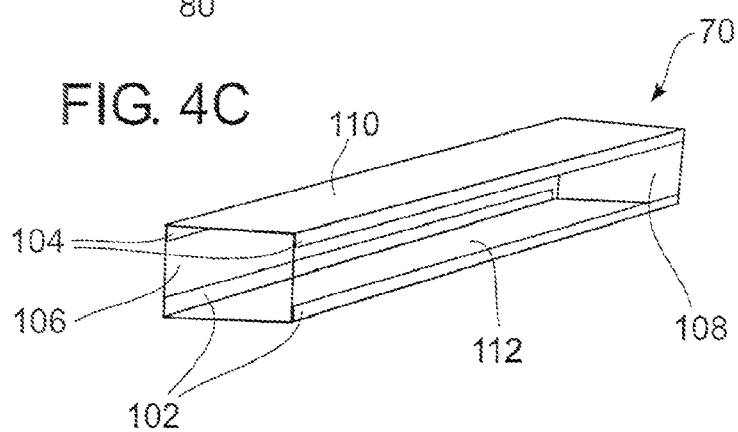
FIG. 4C shows a perspective view of an alternative magnetohydrodynamic channel.

FIG. 4C shows another alternative embodiment for channel 70. In this particular embodiment, anode bands 104 are located on the edges of wall 110 in the corners of the channel created by walls 110, 106 and 108. Similarly, cathode bands 102 are located in the corners formed between wall 112 and walls 106 and 108. Those skilled in the art will realize that the different geometries found in 4A, 4B and 4C are slight and that the channels are substantially similar.

Figure 4D:
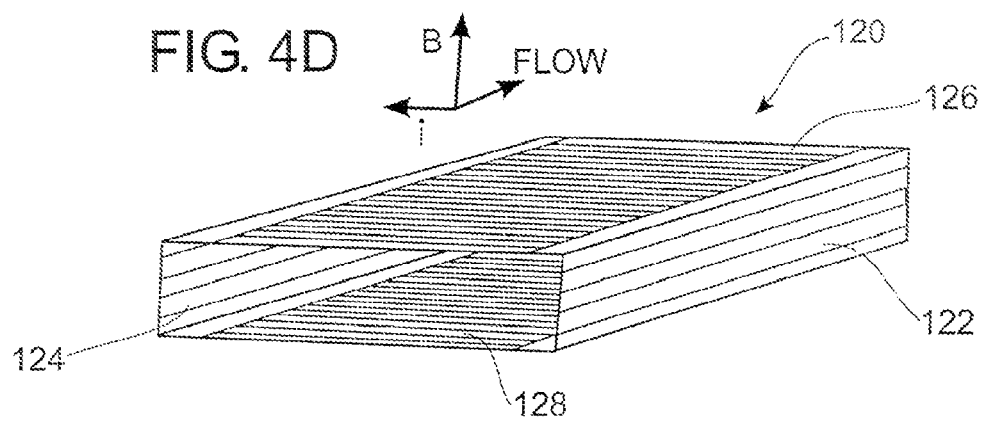
FIG. 4D shows a perspective view of an alternative magnetohydrodynamic channel.

FIG. 4D shows an alternative embodiment that has significant differences from the other illustrated embodiments. Channel 120 is specifically designed to alter the flow profile of the fluid within the MHD channel. Microfluidic channels impose a significant amount of drag on solutions that pass through them. This creates a "D" shaped flow profile. In some situations, it may be advantageous to have a more square shaped flow profile. Channel 120 alters the flow profile by replacing the insulating walls with passive equilibration conducting walls 126 and 128. Passive equilibration conducting walls 126 and 128 contact anode wall 122 and cathode wall 124. The partial equilibration conduction caused by walls 126 and 128 effect the flow pattern of the fluid within the channel 120.

The magnets used to induce the magnetic field are not shown in these drawings. Those skilled in the art will understand that the magnets do not need to be in actual physical contact with the channel or the solution within the channel. It is only necessary that magnets be positioned close to the MHD channel in order to induce a magnetic field in the proper orientation.

Figure 5A:
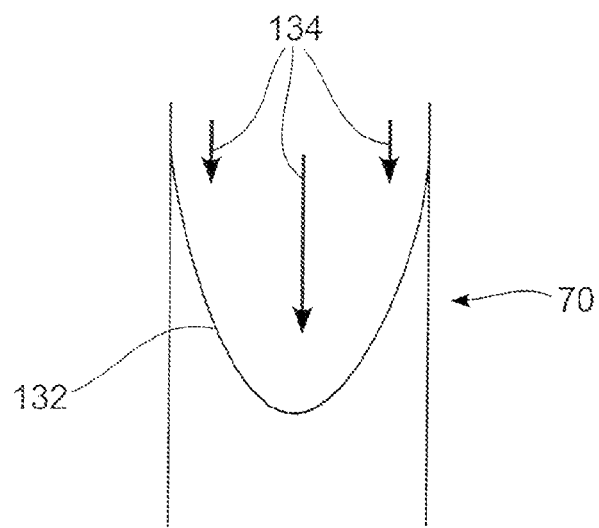
FIG. 5A shows a schematic diagram of a flow pattern of a solution within a magnetohydrodynamic channel.
Figure 5B:
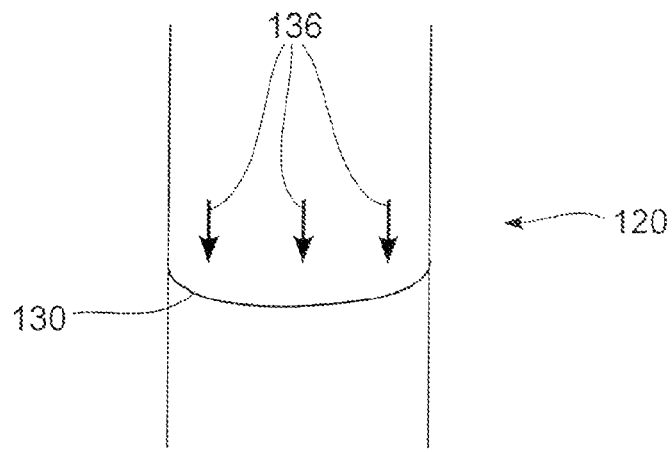
FIG. 5B shows a schematic diagram of an alternative flow pattern of a solution within a magnetohydrodynamic channel.

FIGS. 5A and 5B illustrate different flow patterns. FIG. 5A illustrates the flow through general channel 70. Fluid 132 flows unevenly as indicated by flow vector arrows 134. The least amount of drag is experienced by the portion of the fluid in the middle of the channel. This creates a cone shaped flow pattern. FIG. 5B illustrates a square shaped flow pattern. Fluid 130 moves at an even rate as indicated by flow vector arrows 136. Passive equilibration causes this type of square shaped flow pattern.

Figure 6:
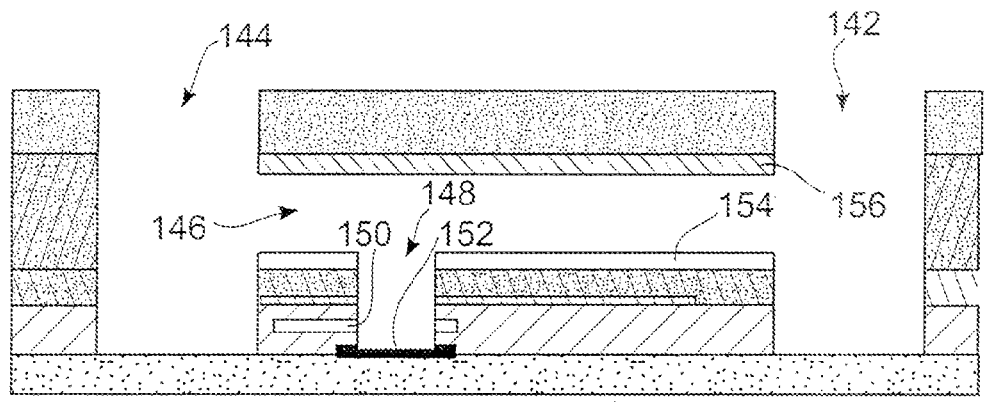
FIG. 6 shows a schematic diagram of an alternative magnetohydrodynamic device.

FIG. 6 shows a microfluidic MHD channel combined with a microcavity sensing device. Microfluidic structure 140 has a first reservoir 142, a second reservoir 144, a microfluidic MHD channel 146 and a microcavity 148. The magnet used to induce a magnetic field is not shown in the illustration. Electrodes 156 and 154 are used in conjunction with an exterior magnet to create the MHD effect. This causes solution in reservoir 142 to enter channel 146 and pass through it, eventually reaching reservoir 144. When the solution encounters microcavity 148, microcavity electrodes 150 and 152 may be used to detect various analytes. Such microcavities are described in detail in U.S. patent application Ser. No. 09/946,249 and U.S. patent application Ser. No. 09/978,734. The microfluidic structure shown in FIG. 6 is a relatively simple design. It may be desirable to incorporate several microcavities along the wall of microfluidic MHD channels. The presence of the magnetic field also induces mixing within the microcavity. This can increase the speed and accuracy of the detection of analytes within the analyte solution.

In an alternative embodiment of microfluidic MHD channels, the channels are fabricated in ceramic tape commercially available from DuPont. The microfluidic devices are fabricated on Green Tape™ 951 series and 851 series. The designs consist of microchannels fabricated on 6 in.$^2$ pieces of substrates with gold electrodes screen printed on the sidewalls of the channels. The thickness of the screen print is 12 um. These electrodes extend to form contact pads at the side of the chip for edge connectors. The gold electrodes form the electrical part of the magnetohydrodynamic pump.

The material used in fabrication is known as Green Tape™ and is also known as Low Temperature Co-fired Ceramic (LTCC). In the pre-fired state the ceramic tape consists of alumina particles, glass frit and organic binder. In the pre-fired state the ceramic tapes are soft, pliable and easily machinable. Mesoscopic features ranging in size from 10 μm to 10 mm can be machined using mechanical, chemical and thermal means. This material is compatible with high conductivity metals such as gold and silver.

Green Tape™ comes in two varieties. The 951 series and the 851 series both have similar compositions but the 851 is white in the pre-fired state and the 951 is blue.

Fabrication Terminology:

Via—hold punched in ceramic tape using a punching machine.

Filled vias—vias filled with metal to form electrical interconnects between layers.

Catchpads—patches of metal printed on the tape directly above filled vias to assist with the electrical interconnect.

Registration holes—vias punched at four corners of the ceramic tape to assist in stacking of the tapes during the lamination process.

Alignment holes—vias close to the registration holes to assist with alignment during the screen print process.

Screen print—process of printing metal onto the ceramic tape.

Figure 9:
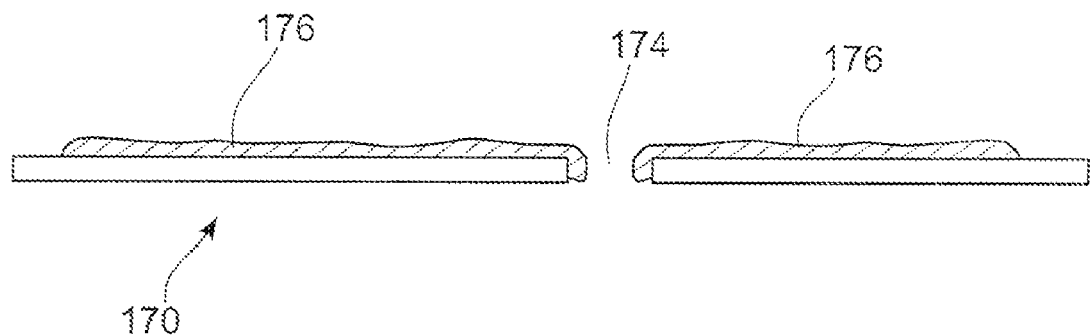
FIG. 9 shows a cross-sectional view of the schematic diagram of the magnetohydrodynamic device of FIG. 8.

The fabrication process for the Green Tape™ proceeds in several steps. The tape comes in a roll, which is cut into 6 in$^2$ pieces, then cured at 120° C. for 30 minutes. Then registration and alignment holes are punched along with other features necessary for the overall function of the device such as microchannels are vias. Each layer is fabricated separately. These individual layers will eventually be arranged in the proper order (stacked) to form a 3D structure. The next step after punching is the via fill. In this stage vias are filled with metallic, conductive ink. These help to form electrical interconnections between layers. After this, screen-printing of the gold electrode ensues. By this stage all the microchannels have been punched on the tape and the sidewalls of the microchannel are coated with metal by pulling a vacuum through during the screen print (FIG. 9). After the screen print process is lamination. With the aid of the registration holes the various layers are stacked together then vacuum sealed and a hydraulic pressure of 3500 psi at 80° C. is applied for 10 minutes. Then the substrate is baked at 850° C. for 8 hours.

The Green Tape™ shrinks on heating. There is a 12% shrinkage in the x,y plane and 15% shrinkage in the z-axis. The shrinkage is predictable thus can be compensated for during the design.

There are several methods available to create vias and microchannels on the ceramic tape. These methods include milling, punching, jet vapor etching and laser machining.

A 3 dimensional channel system may be designed by stacking several layers of the tape. The sidewalls of the channels may be coated with gold to form the electrodes for the magnetohydrodynamic pump.

Figure 7:
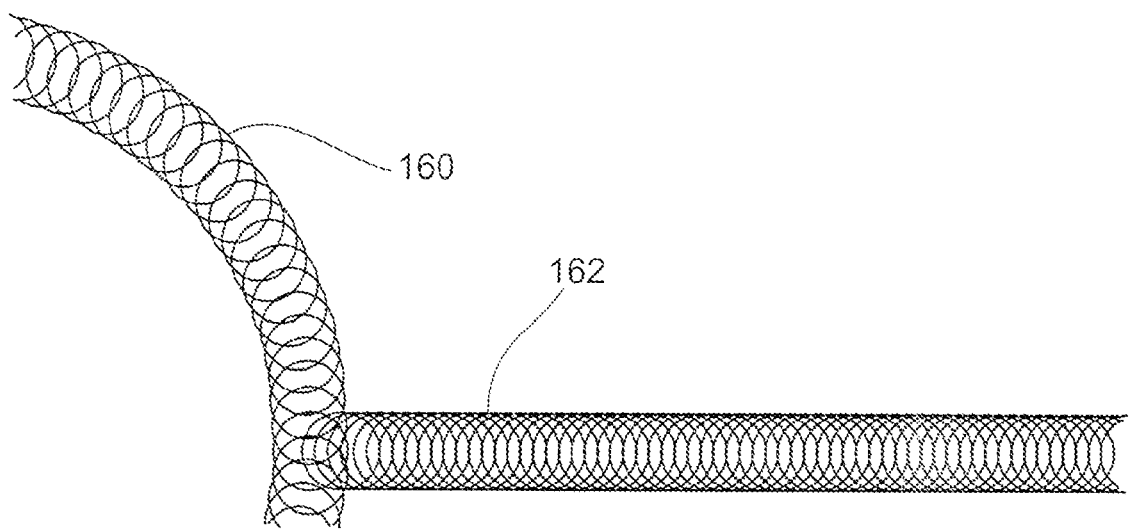
FIG. 7 shows a schematic diagram of a hole punch pattern for forming a magnetohydrodynamic device on ceramic tape.
Figure 8:
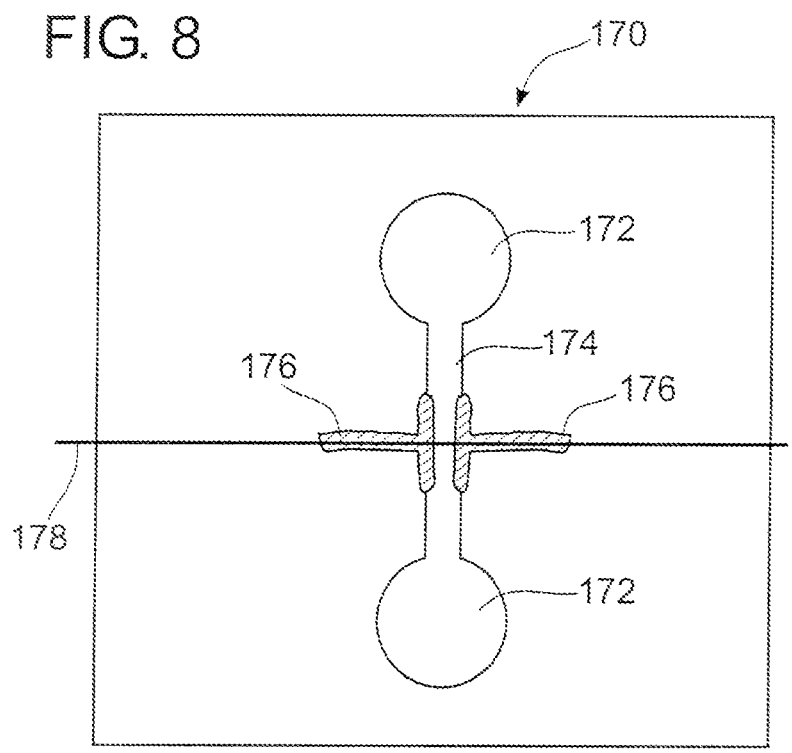
FIG. 8 shows a schematic diagram of a magnetohydrodynamic device formed on a piece of ceramic tape.

FIG. 7 illustrates the use of a hole puncher to form channels and reservoirs in ceramic tape. FIG. 7 is an enlarged schematic diagram of the whole punching pattern used. Circular hole punch pattern 160 is used to form reservoirs in the tape. Straight hole punch pattern 162 is used to form a channel. By punching several holes in an overlapping manner, a channel and ring may be formed. FIG. 8 shows a top plan view of a piece of ceramic tape 170 that has had reservoirs 172 and channel 174 punched through it. Electrodes 176 are formed by screen printing conductive ink in a cross shaped pattern over the channel as shown in FIG. 8. A vacuum is applied to the opposite side of the tape. This causes the ink to run down the sides of the channel and to separate so as to form two (2) electrodes. FIG. 9 is a cross sectional view of the same piece of tape shown in FIG. 8 along cross section line 178. FIG. 9 shows how electrodes 176 run along the inside of channel 174 on opposite walls. Excess conductive ink is pulled through channel 174 by the vacuum, so as to prevent channel 174 from being filled. By this method, 2 microelectrodes 176 are formed within the channel.

Figure 10:
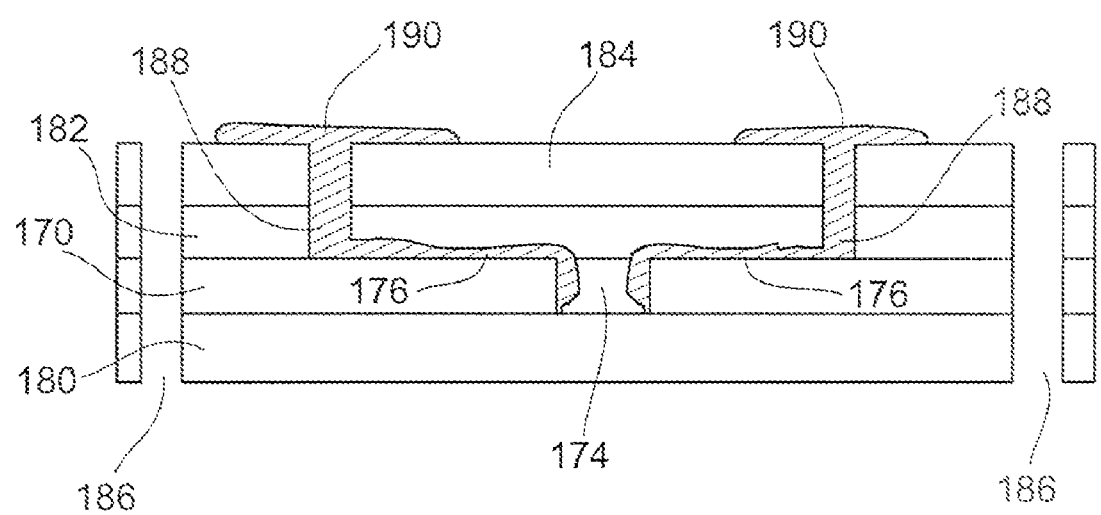
FIG. 10 shows a schematic diagram of a magnetohydrodynamic chip comprised of ceramic tape and incorporating the ceramic tape of FIGS. 8 and 9.

FIG. 10 shows the same piece of ceramic tape stacked with additional pieces of ceramic tape in order to form a microfluidic chip. Channel tape 170 shown in FIGS. 8 and 9 rest on top of support tape 180 and underneath via tape 182. Via tape 182 has holes filled with conductive material positioned such that they engage electrodes 176. Resting atop via tape 182 is top tape 184. Top tape 184 also has vias filled with conductive material. On the top side of tape 184 are catch pads 190. The catch pads are significantly larger than the extremely small vias 188. This is to facilitate connection to an electric current. Each catch pad 190 is connected to an electric current power source, such that one acts as an anode while the other acts as a cathode. Current travels from the catch pad through vias 188 down to electrodes 176. The current carrying species within the solution in channel 174 completes the circuit.

In this particular embodiment, the conductive material that the electrodes and catch pads are comprised of an that fill the vias is either gold or silver conductive ink. However, those skilled in the art will understand that any conductive material that is compatible with co-fired ceramic tape will be suitable.

All 4 pieces of ceramic tape have aligning holes 186. Proper alignment of these holes insures that the catch pads, vias and electrodes are aligned properly so that they may conduct electric current. Once the ceramic tape pieces have been fabricated and aligned, they are fired together to form a single solid chip. Prior to firing, the tape is flexible. However, once fired the chip structure becomes rigid. Because the chip is very thin, they may become brittle if there are an insufficient number of tape layers. Therefore, it is often desirable to include extra tape layers to strengthen the chip. FIG. 10 shows a chip having 4 layers. It is often more practical to form chips comprised of 10 or more layers to add strength and support. These additional layers may consist of additional support tapes, additional via tapes and/or additional channel tapes.

Figure 11:
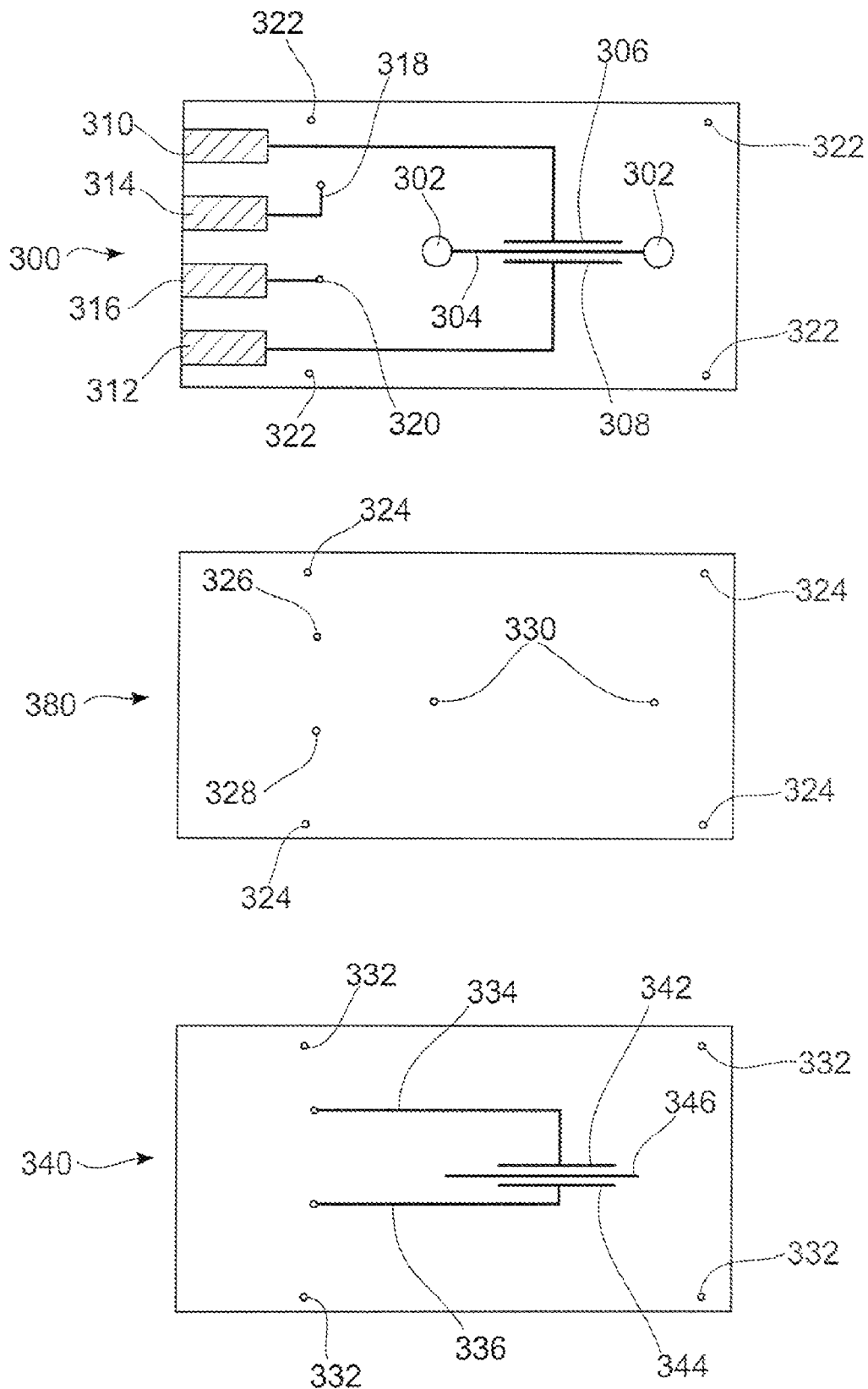
FIG. 11 shows a schematic diagram of a series of pieces of ceramic tape designed to form a magnetohydrodynamic chip having a feedback loop.

FIG. 11 shows a top down schematic diagrams of alternative chip configurations. The embodiment shown in FIG. 11 forms a microfluidic MHD channel having a feedback loop. Top plate 300 has reservoirs 302 that are connected by main channel 304. Main channel electrodes 306 and 308 are screen printed onto the ceramic tape such that they are connected to catch pads 310 and 312 respectively.

Reservoirs 302 and main channel 304 are formed by the manner shown in FIG. 7. Overlapping punch holes are used to form the pattern.

Catch pads 314 and 316 are screen printed such that conductive material connects them to vias 318 and 320 respectfully. These vias are formed using the same hole puncher used to form the reservoir/channel design. Four aligning holes 322 are also punched into the tape. Second tape 380 has aligning holes 324 that correspond to aligning holes 322 in the top tape 300. Vias 326 and 328 are filled with conductive material and correspond to vias 318 and 320 respectively. Transport vias 330 correspond to reservoirs 320. These vias are left hollow so that the solution may pass through them.

Bottom plate 340 has alignment holes 332 that correspond to alignment holes 324 and tape 380 and to holes 322 and tape 300. Conductive pattern 334 is applied to bottom plate 340 such that via 326 is conductively connected to feedback channel electrode 342. Similarly, conductive pattern 336 is applied to bottom tape 340 in such a way as to conductively connect via 328 to feedback channel electrode 344 when the 3 tapes are stacked. Feedback channel 346 is formed by making overlapping hole punches as shown in FIG. 7. Once all of the holes have been punched in the tape and the conductive material has been applied, the 3 tapes are stacked and co-fired. As with the previous example, it is often desirable to include several additional layers of tape in order to strengthen the final chip.

Figure 12:
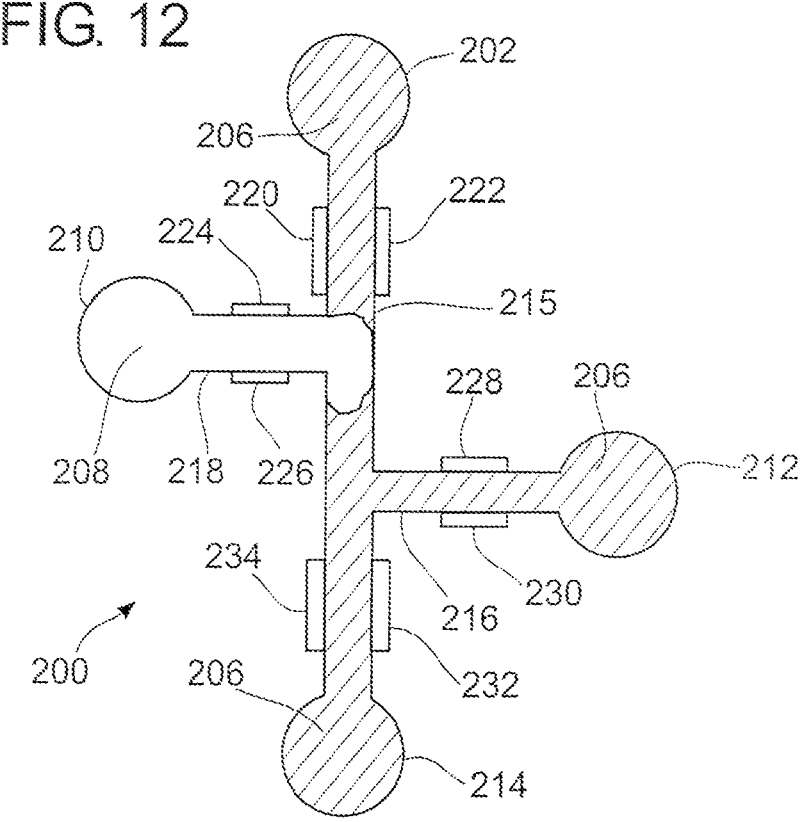
FIG. 12 shows a schematic diagram of an alternative embodiment of a magnetohydrodynamic device.

FIG. 12 shows an alternative embodiment of a microfluidic MHD channel designed to measure the volume of the analyte solution being analyzed. This embodiment is particularly well suited for keeping the analyte solution separate from the pumping solution. Analyte solution 208 is located in reservoir 210. Electrodes 224 and 226, in conjunction with a magnetic field applied to the structure 200, causes analyte solution 208 to flow through introduction channel 218 and into main channel 215. Main channel electrodes 220, 232, 234 and 222 are not active. Exit channel electrodes 228 and 230 are active and draw pumping solution 206 from the main channel 215 through the main channel 215 toward exit channel 216 by the vacuum caused by the pumping of the pumping solution 206 by electrodes 228 and 230.

Figure 13:
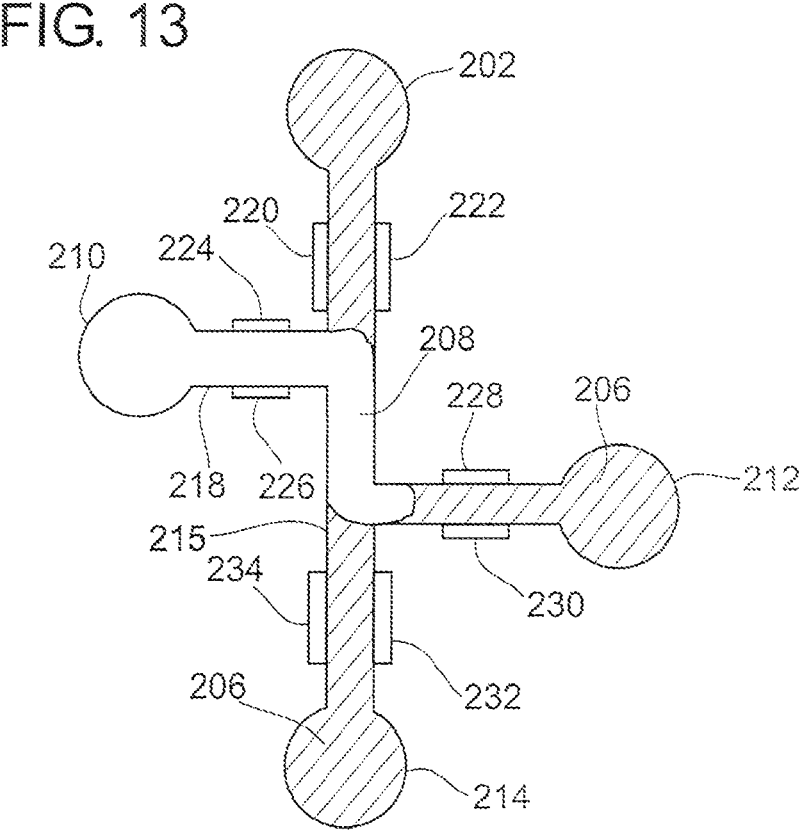
FIG. 13 shows the magnetohydrodynamic device of FIG. 12 after analyte solution has entered the main channel.
Figure 14:
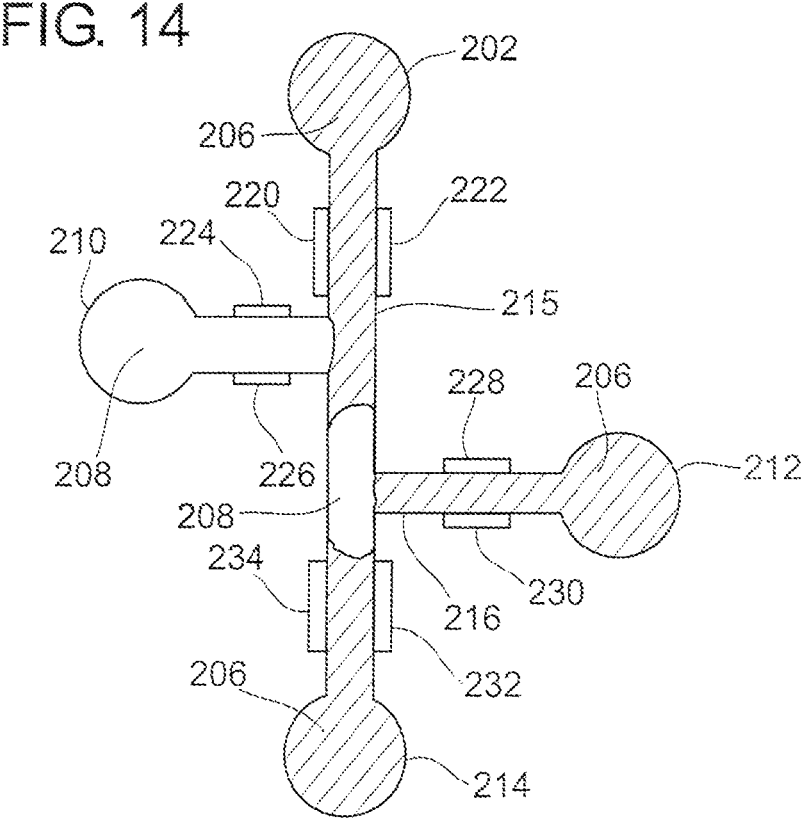
FIG. 14 shows the magnetohydrodynamic device of FIG. 12 where the device is pumping the analyte solution toward a reservoir.

Once analyte solution 208 begins to enter the exit channel 216, as shown in FIG. 13, introduction channel electrodes 224 and 226 and exit channel electrodes 228 and 230 are turned off. Main channel electrodes 220, 222, 232 and 234 are turned on to cause pumping solution 206 to enter the main channel 215 from reservoir 202 and to exit the main channel 215 into reservoir 214. The movement of the pumping solution 206 causes the analyte solution 208 to travel down main channel 215 toward reservoir 214, as shown in FIG. 14. Analysis of the analyte solution may occur at any point within the structure. In addition, other microfluidic channels may be added to main channel 215 or reservoir 214 and the analyte solution may be pumped through them.

Figure 15:
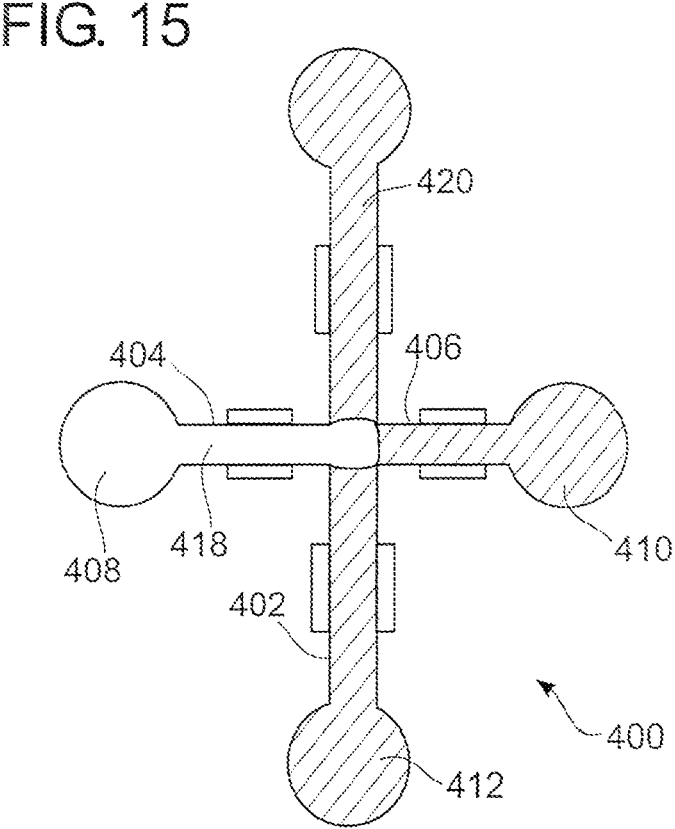
FIG. 15 shows an alternative embodiment of a magnetohydrodynamic device.

The amount of analyte solution analyzed is determined by the distance between the introduction channel 218 and exit channel 216. The distance between these two channels multiplied by the cross-sectional are of the channel equals the volume of analyte solution drawn into main channel 215. FIG. 15 shows a microfluidic structure that operates in the same fashion as the structure shown in FIGS. 12, 13, and 14. However, in structure 400 introduction channel 404 and exit channel 406 join main channel 402 at the same point. This causes the portion of the analyte solution 408 that ravels to reservoir 412 to be as small as possible. Pumping solution 420 propels analyte solution 418 down main channel 402.

Pumping solutions 206 and 420 may be hydrophobic and analyte solutions 208 and 418 may be hydrophilic, or vice versa. This prevents the analyte solution from mixing with the pumping solution. Those skilled in the art will understand that there are advantages to keeping the analyte solution free of carrier species.

Other microfluidic pumping devices may be readily adapted for use in conjunction with a MHD system. The analyte solution may be introduced into the main channel using a different type of pumping. Once the analyte solution is within the main channel, an immiscible pumping solution may be used to propel the analyte solution through the structure.

Figure 16:
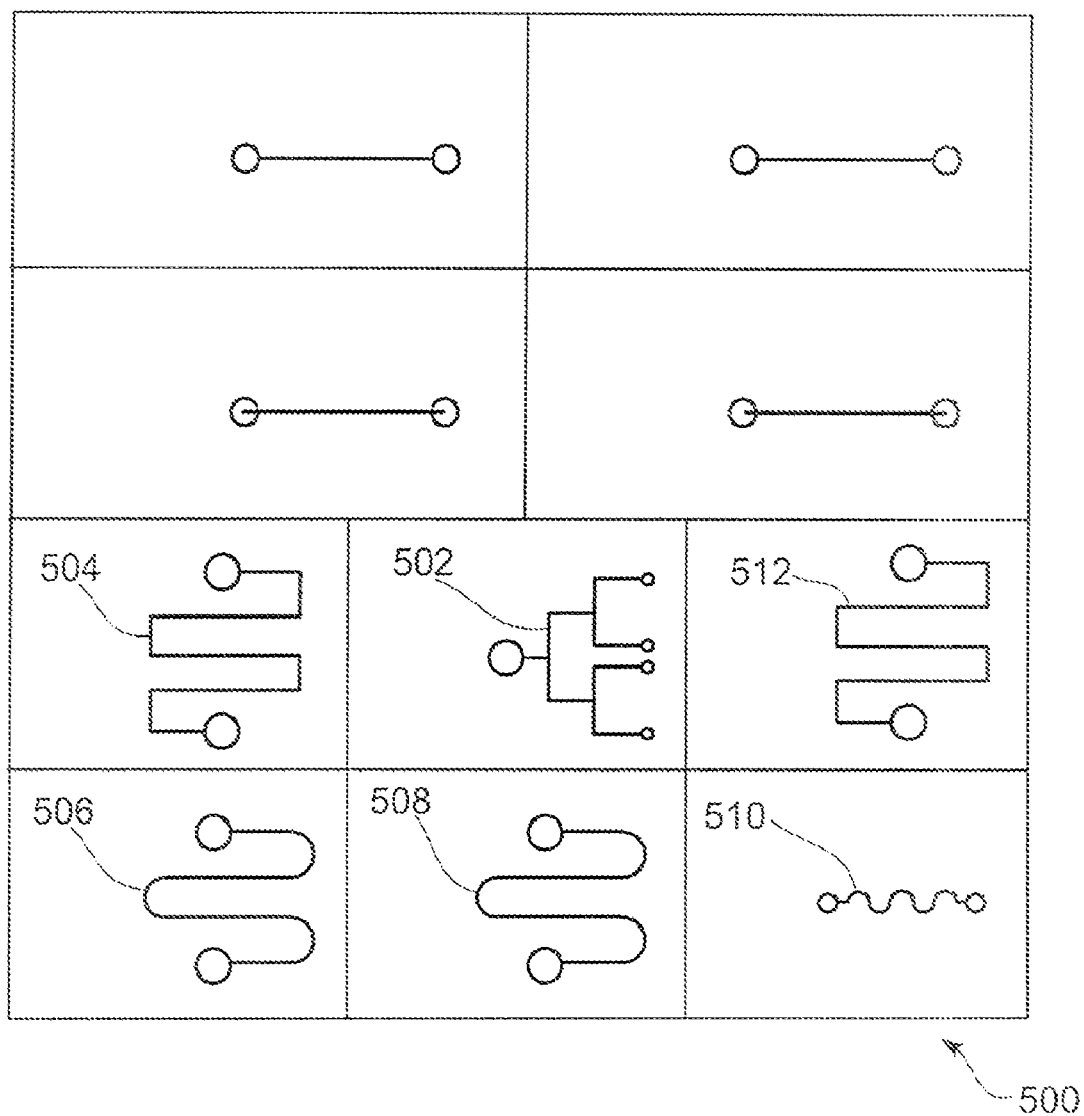
FIG. 16 shows alternative design patterns for microfluidic channels on ceramic tape.

The above embodiments describe a single channel with or without a second feedback loop. One embodiment describes a main channel and two side (introduction and exit) channels. However, those skilled in the art will appreciate that a natural extension of these designs include a series of microfluidic channels, each utilizing the same magnetic field and each having independently addressable electrodes. These channels may be interconnected so that fluids may be propelled by Lorentz forces through more than one or all of them. FIG. 16 shows a piece of ceramic tape 500 having a number of microchannel structures. Microchannel 502 illustrates how a microchannel may have several branches, while microchannels 504, 506, 508, 510 and 512 show a variety of different microchannel patterns.

Figure 17:
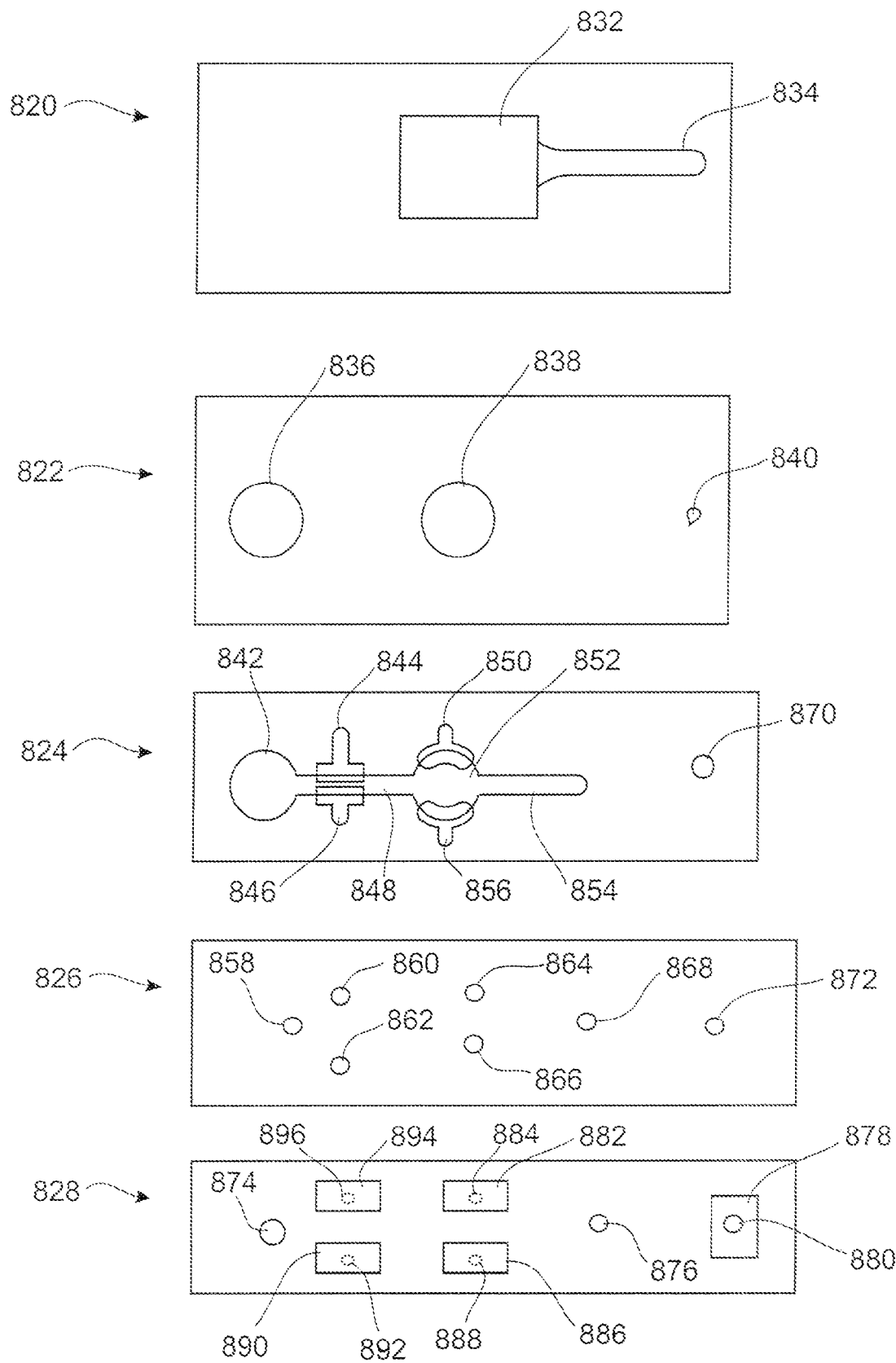
FIG. 17 shows a series of pieces of magnetic tape that may be stacked to form the microfluidic chip shown in FIG. 18.
Figure 18:
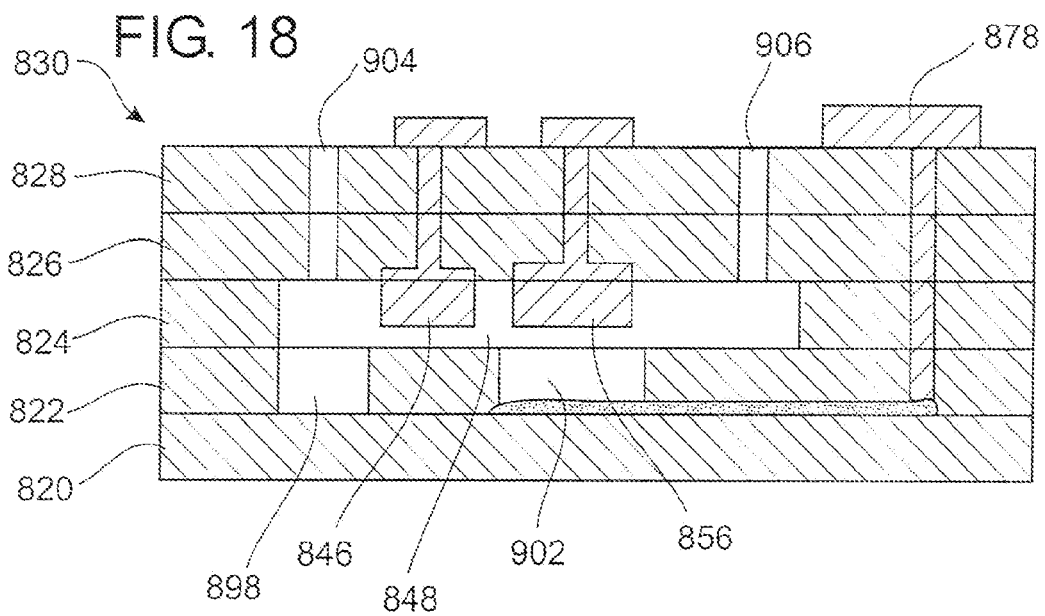
FIG. 18 shows a microfluidic chip capable of performing a redox assay.

FIG. 17 show a series of pieces of ceramic tape 820, 822, 824, 826 and 828. These pieces of LTCC may be stacked and fired to form a ceramic chip capable of performing redox assays. Tape 820 has a gold electrode 832 stamped onto it in the form of gold ink. Gold ink circuit 834 extends away from electrode 832 and is aligned with vias that conductively connect it to a catch pad as described below. Electrode 832 will serve as the bottom of assay structure 902 as shown in FIG. 18.

Chip 822 has two holes that will serve as reservoirs punched through it, as well as filled via hole 840. Hole 836 will form the bottom portion of a sample reservoir 898 in FIG. 18. Hole 838 will form part of assay structure 902. Via 840 is filled with conductive, metallic ink.

Central tape 824 has hole 842 that in conjunction with hole 836 forms sample reservoir 898. Similarly, hole 852 in conjunction with hole 838 forms assay structure 902. Holes 842 and 850 are connected by conduit 848. As can be seen in FIG. 18, conduit 848 is sandwiched between tapes 826 and 822 to form a magnetohydrodynamic conduit. Electrodes 844 and 846 are used to form an electric field within conduit 848 such that fluids having carrier species may be transported from sample reservoir 898 to assay structure 902. Electrodes 850 and 856 are located on the sides of hole 852 and may serve as detecting electrodes within assay structure 902. Exit conduit 854 allows a sample to be pushed out of assay structure 902. Alternatively, conduit 854 exposes fluids within the microfluidic structure to the environment, thereby relieving back pressure. Filled via 870 allows electrode 832 to be connected to a catch pad.

Tape 826 consists of microfluidic conduits 858 and 868, as well as filled vias 860, 862, 864, 866 and 872. These filled vias connect electrodes to catch pads on the top layer piece of tape 828. Sample conduit 858 is part of conduit 904 that allows sample to be introduced into sample reservoir 898. Conduit 868 allows conduit 854 to be exposed to the environment, thereby relieving back pressure for allowing sample to exit the microfluidic chip.

Top layer top 828 has hole 874 that completes conduit 904 and allows introduction of a sample into sample reservoir 898. Similarly, hole 876 completes conduit 906. Catch pad 878 is comprised of gold ink and lies directly above filled via 880. Catch pad 878 is thereby conductively linked to electrode 832. Catch pads 894, 892, 882 and 886 are similarly connected to electrodes 844, 846, 850 and 856 by filled vias 860, 862, 864 and 866 respectively. These catch pads allow current to be conductive to their respective electrodes. This facilitates MHD propulsion and detection of redox cycling.

The tape layer shown in FIG. 17 is layered as shown in FIG. 18 to form microfluidic assay chip 830. Structure 830 is then fired so as to form the microfluidic assay chip. Aligning holes may be added to the tape layers, but is not shown here for clarity. Similarly, magnets are applied to the top and bottom of chip 830 to allow MHD propulsion through conduit 848. The similarly is not shown for clarity, but their positioning would be clear to one skilled in the art.

This relatively simplistic microfluidic assay chip 830 is operated in the following procedure. First, sample is introduced through conduit 904 into sample reservoir 898. Sufficient sample is introduced such that some enters conduit 848 in between electrodes 844 and 846. Because this assay is a redox assay, the sample being tested may also serve as a carrier species. An electric field is then applied to conduit 848 through electrodes 844 and 846 so as to induce MHD propulsion. In this manner, the sample will enter the assay structure 902. Conduit 906 prevents the build up of back pressure. Leaving conduit 904 exposed to the environment also relieves back pressure. Due to the relatively small diameters of conduits 904 and 906, the effects of evaporation are greatly reduced.

Once the sample enters assay structure 902, redox cycling may be measured. Any combination of two of electrodes 850, 856 and 832 may be utilized to measure redox cycling by cyclic voltammetry or other methods known in the art. In this embodiment, three electrodes are present within the assay structure and all three may be utilized. However, only two electrodes are necessary to perform redox cycling, as is well recognized by a skilled artist.

Those skilled in the art will appreciate that the concentration of a variety of redox compounds may be detected by the present invention. One particularly useful assay for use in the present invention is the detection of dopamine. Measuring low concentrations of dopamine has proven difficult because it is usually found in extracellular fluids that also include ascorbic acid in significantly greater concentrations. The chip described in FIG. 18 allows dopamine to constantly cycle between electrodes while ascorbic acid is irreversibly oxidized and censes contributing to electric current after a few seconds.

Figure 19:
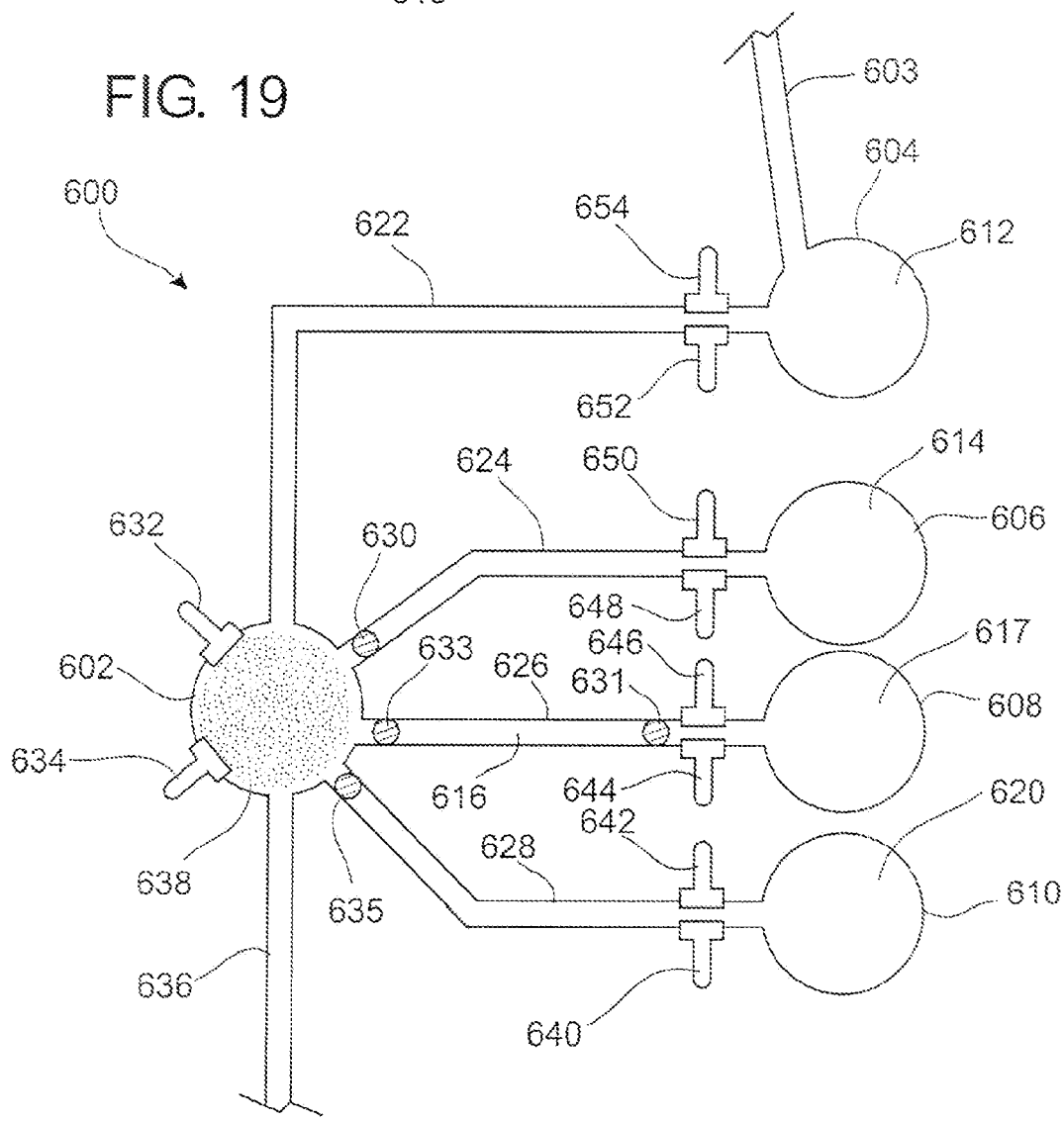
FIG. 19 shows a schematic diagram of a microflidic assay structure.

FIG. 19 shows a diagrammatic top view of a system designed for conducting an assay within a magnetohydrodynamically driven microfluidic system. The scheme in FIG. 19 may be used in microfluidic systems formed with either ceramic tape or photolithographic methods. The scheme of FIG. 19 may be punched or etched into a single layer that is then sandwiched between upper and lower layers.

Those skilled in the art will appreciate that FIG. 19 is one of many possible configurations for the assays disclosed herein and is therefore essentially a schematic diagram.

The sample 612 that is being analyzed is first placed in sample reservoir 604 by means of insert port 603. This may be accomplished by a variety of methods including, but not limited to, injection by a syringe, using either a micro or macro scale pump and capillary action. If sample 612 is known to have a carrier species at a relatively high concentration, no carrier species will need to be added to facilitate MHD propulsion. However, it may be necessary to add an appropriate carrier species. It is also desirable that sample 612 have relatively low concentrations of salts. Although salts may assist MHD propulsion, they lead to rapid corrosion of electrodes. It may therefore be desirable to remove salts by precipitation or other methods known in the arts. Of course, if the microfluidic chip into which this assay is incorporated is intended to be a single use, disposable chip, corrosion of the electrodes is inconsequential.

Once sample 612 has been inserted into reservoir 604, electric current is applied to electrodes 654 and 652 such that one is an anode and one is a cathode, thereby creating an electric field. Permanent magnets above and below structure 600 (not shown) provide a magnetic field. This causes sample 612 to flow through conduit 622. Those skilled in the art will appreciate that one of the disadvantages of MHD propulsion is that it has slow flow rates. One of the advantages of using MHD in microfluidic systems is that conduits through which fluids flow are relatively short. This allows even the slow flow rate of MHD to provide for rapid analysis. Sample 612 flows through conduit 622 into assay structure 602. Those skilled in the art will appreciate that it may be possible to apply sample 612 directly to assay structure 602 without the need for sample reservoir 604 or conduit 622. However, those skilled in the art will also appreciate that whichever structure, assay structure 602 or sample reservoir 604, the sample is applied to will be exposed to the open environment and therefore subject to evaporation. Evaporation is a serious factor to consider with very small volumes. If assay structure 602 is not exposed to the environment, the concentration will remain constant. Therefore, it is often advantageous to utilize a separate sample reservoir. In addition, although not shown, those skilled in the art will appreciate that it is a relatively simple matter to add additional sample conduits to reservoir 604 that connect it to additional assay structures such that a variety of assays may be performed on a single sample.

Assay structure 602 has detecting electrodes 632 and 634. In this particular embodiment, the MHD assay chip is formed on ceramic tape. Therefore, electrodes 634 and 632 are comprised of a metallic, conductive ink that is printed onto a layer of tape. Those skilled in the art will appreciate that if the microfluidic structure is formed using photolithographic techniques, it may be easier and more desirable to have detecting electrodes that are formed as tubular nanoband electrodes.

Primary analyte binding material 638 is located on either the top or the bottom (or both) of assay structure 602. Analyte binding material 638 may be comprised of any of a variety of materials well known to those skilled in the art. In this particular embodiment, analyte binding material 638 is a primary antibody developed for an ELISA technique. In this particular embodiment, assay structure 600 is designed to detect the microorganism *Cryptosporidium parvum*. Therefore, ABM 638 is a primary antibody that is specific for *C. parvum*. It is attached to a self-assembled monolayer formed by lipids having a sulphate group on their hydrophilic ends. The sulphate group is covalently bound to gold ink printed on the ceramic tape layer that comprises the bottom of the assay structure 602. Once sample 612 enters assay structure 602, any *C. parvum* present will bind to ABM 638.

Rinse reservoir 606 contains a rinsing solution 614. Rinsing solution 614 may simply be DI water. Alternatively, solution 614 may be comprised of a series of buffers and/or salts and having a pH that optimizes the ELISA being performed. Additionally, rinse solution 614 has adequate concentration of a carrier species to facilitate MHD propulsion. A current is applied to electrodes 650 and 648 such that one serves as a cathode and one an anode. This in conjunction with permanent magnets above and below conduit 624 cause solution 614 to enter assay structure 602. Conduit 624 has hydrophobic bead 630 in order to prevent premature mixing. Those skilled in the art will appreciate that hydrophobic bead 630 may not be necessary because of the relatively little mixing in a microfluidic system. Hydrophobic bead 630 is comprised of a hydrophobic liquid, such as an oil. It serves as a plug between conduit 624 and assay structure 602.

Once sufficient time has elapsed for substantially all *C. parvum* present in sample 612 to bind to ABM 638, solution 614 is propelled into assay structure 602 using MHD. Sample solution 612 and some of solution 614 exits assay structure 602 through conduit 636. Conduit 636 may lead to a waste reservoir for discarded fluid. Alternatively, conduit 636 may lead to a second assay structure.

Once assay structure 602 has been rinsed by fluid 614, solution 616 held in reservoir 608 is then introduced to assay structure 602. In this embodiment, fluid 616 caries a secondary ABM, in this case a secondary antibody specific for *C. parvum* having an electroactive complex covalently attached. Solution 616 is located in conduit 626 between hydrophobic beads 633 and 631. Beads 633 and 631 may be comprised of the same material as beads 630 in conduit 624. 617 may be comprised of the same solution as 616 or may be a different solution. Almost any solution will be suitable for 617 so long as it has an adequate concentration of carrier species to facilitate MHD propulsion. When a current is passed through electrodes 646 and 644, MHD propulsion of solution 617 is facilitated by the electric field and magnetic field provided by permanent magnets not shown. The presence of beads 631 and 633 prevents additional secondary ABM from entering assay structure 602 after excess secondary ABM has been rinsed out of assay structure 602. Furthermore, because bead 631 is downstream of electrodes 644 and 646, it is not necessary that solution 616 have a carrier species. This reduces the amount of carrier species present in assay structure 602 and helps to reduce background noise of electrochemical measurements. Beads 633 and 631 are not necessary for the present invention to function properly. However, they are generally preferred because they usually increase the accuracy of the invention. It is possible for reservoir 608 to hold solution 616 and for 616 to have a carrier species in it.

Once secondary ABM solution has entered assay structure 602 and sufficient time has been allowed for secondary ABM to attach to any *C. parvum* present, assay structure 602 is again rinsed with solution 614.

This removes excess, unbound secondary ABM. The next step in the assay is to activate the electroactive complex. The method of activation will depend upon the type of electroactive complex used. Here, the electroactive complex is alkaline phosphatase. Therefore, activation of the electroactive complex consists of adding PAP to assay structure 602.

Substrate reservoir 610 holds substrate solution 620 which contains PAP. Because PAP is a redox compound, it may also double as a carrier species for MHD propulsion. When a current is applied to electrodes 642 and 640, the electric field in conjunction with the magnetic field produced by magnets above and below this structure cause substrate solution 620 to enter assay structure 602 by traveling down conduit 628. As does conduits 624 and 626, conduit 628 has a hydrophobic bead plug 635. As with the other beads, this bead is not necessary but is preferred. Those skilled in the art will appreciate that although PAP is the substrate used for alkaline phosphatase, other electroactive complexes may require other substrates that may or may not be redox species. Solution 620 may be comprised of substrates or other activating compounds, such as a buffer that changes pH within the assay structure. As described above, some electroactive complexes are activated by change in pH. Activating species may also be a coenzyme or cofactor. Those skilled in the art will also appreciate that some electroactive species will not require the addition of a solution to be activated. In that situation, reservoir 610 and conduit 628 are unnecessary.

In this particular embodiment, assay structure 602 is rinsed by solution from reservoir 606 twice. Those skilled in the art will appreciate that this will also be accomplished by utilizing two reservoirs instead of one.

Once the electroactive species has been activated by addition of an activating compound or other means, current is run through electrodes 632 and 634. Cyclic voltammetry or other current measuring methods may be utilized to evaluate the electrochemical activity of the contents of assay structure 602. The presence of two electrodes within the assay structure facilitates measurements of cyclic voltammetry and also facilitates redox cycling to amplify the electrochemical signal.

Those skilled in the art will appreciate that there will also be background noise. To evaluate background noise so that it may be subtracted from the signal received by electrodes 632 and 634, it may be desirable to include a second control assay structure in a chip. A control assay structure would include all of the same features of microfluidic assay structure 600 except for the presence of primary ABM 638. The process would be run simultaneously on the same sample. Sample for the control may be MHD driven from reservoir 604 or may have its own sample reservoir separate from structure 600. In addition, due to the extremely small size of assay structure 600, several such assay structures may be placed in an array or grid pattern on a chip. The array would include one or more controls as well as a variety of assays. Binding materials may be antibodies specific for other microorganisms or molecules. ABMs may also be DNA probes, protein substrates or other compounds having specificity. In addition, the primary ABMs located within the structure that cause an analyte to immobilize may alternatively be comprised of a binding material lacking specificity. Examples of this include polystyrene and nitrocellulose.

Assay structure 600 is designed such that electrodes 640, 642, 644, 646, 648, 650, 652 and 654 are all aligned such that they may all use the magnetic fluid from a pair of large magnets located above and below the electrodes. The magnets may be electromagnets, but permanent magnets are preferred in order to reduce energy consumption of assay chips. Because the electrodes are aligned, long, narrow magnets may be used thereby both simplifying manufacture and reducing the amounts of material needed. While it is preferred to utilize a structure that requires only a single, localized magnetic field, other configurations are possible. However, utilizing multiple magnetic fields unnecessarily complicates this device. When an array of assays are used, it would be desirable to align all the electrodes used for MHD propulsion either in a single long line or in a single region of the chip such that they may all use a single magnetic field. Electrodes 632 and 634 are not associated with MHD propulsion electrodes because they are used for measuring electric current and not for moving fluid within the microfluidic structure.

Figure 20:
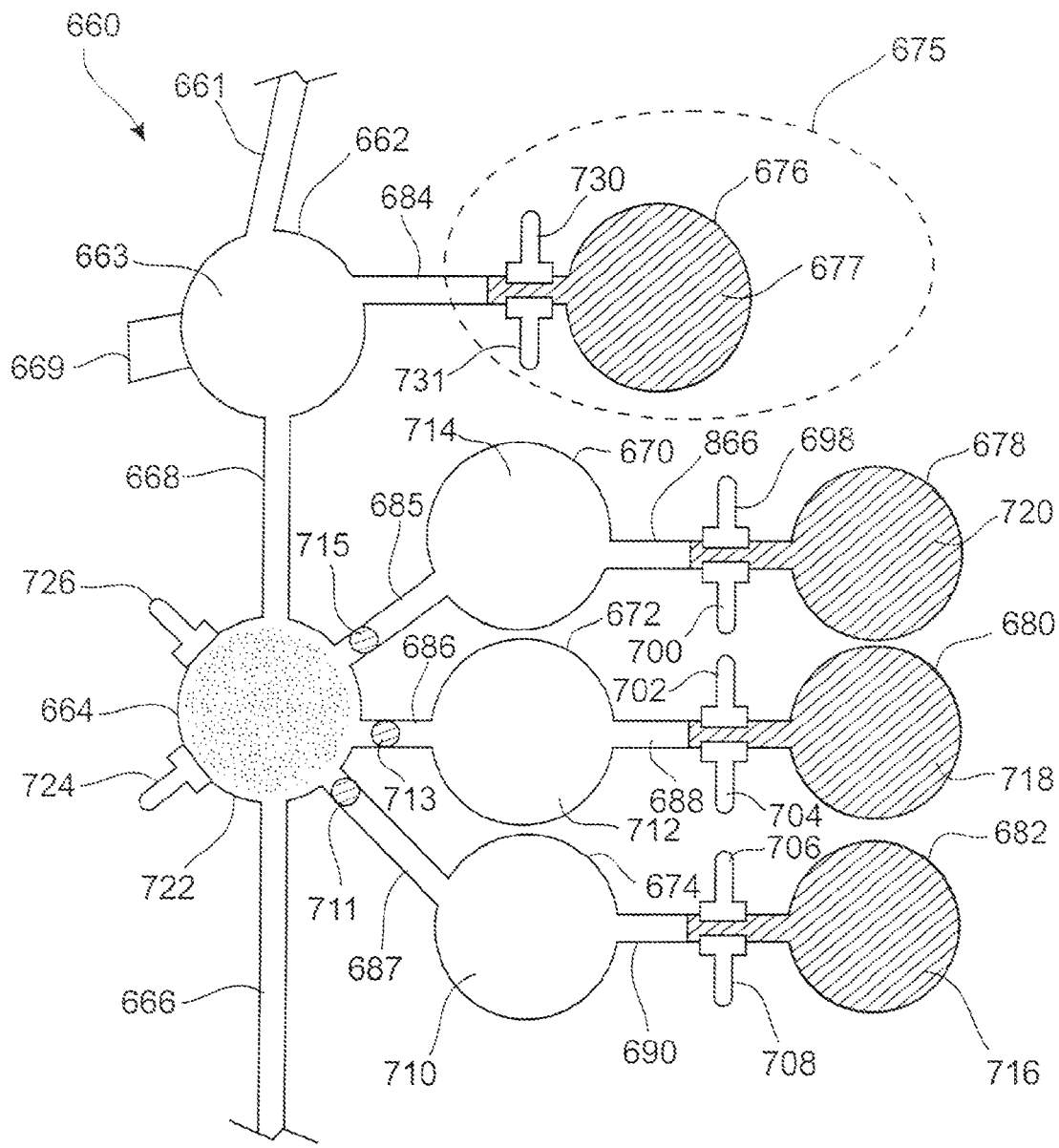
FIG. 20 shows an alternative microfluidic assay structure.

FIG. 20 shows a schematic diagram of an alternate embodiment of the present invention. Because MHD propulsion requires the presence of a carrier species, substantial additional background noise often results in electrochemical measurements of assays. This is because carrier species by their nature are capable of redox cycling. This can make electrochemical measurements more difficult at low analyte concentrations. To overcome this, the present invention has described the techniques shown in FIGS. 12 through 15. FIG. 18 shows how those techniques could be applied for use in small scale assays. This improves the sensitivity of the assays. The structure or method is very similar to that described in FIG. 19. The significant difference between the diagrams shown in FIGS. 19 and 20 is that FIG. 20 employs "hydrophobic pumps" to inject the sample, secondary ABM solution, rinse solution and activating solution into the assay structure.

Sample solution 663 is placed into sample solution reservoir 662. This may be accomplished in the same methods by which sample solution 612 is placed in reservoir 604 of FIG. 19. However, the microfluidic assay structure 660 of FIG. 18 requires that once sample solution 663 is placed in reservoir 662, reservoir 662 must be sealed hermetically. If reservoir 662 is not sealed properly, then activation of hydrophobic pump 675 will result in a substantial portion of the sample to exit through entry port 661. This may be accomplished by partially filling port 661, thereby blocking it, or by placing some sort of seal over port 661.

Once reservoir 662 is no longer exposed to the outside environment, hydrophobic pump 675 is actuated. This is accomplished by applying current to electrodes 730 and 731 such that an electric field is formed between them. Permanent magnets (not shown) above and below conduit 684 create a magnetic field in approximately the same region as conduits 684 to which electrodes 730 and 731 apply an electric field. Pump reservoir 676 is filled with pump fluid 677. Pump fluid 677 is hydrophobic. Hydrophobic solutions may be comprised of any hydrophobic compound so long as it is liquid at room temperature and is capable of dissolving a carrier species. Those skilled in the art will appreciate that there are a variety of organic redox cycling compounds that are soluble in hydrophobic solutions. Various compounds used in cellular respiration within mitochondrial membranes are well suited to be these carrier species. When electric current is applied to electrodes 730 and 731, Lorentz forces induce MHD propulsion of the hydrophobic fluids. This pushes the aqueous sample from sample reservoir 662 down conduit 668 and into assay structure 664. Once sufficient sample has entered assay structure 64, the electrical current is ceased and the hydrophobic pump is thereby deactivated. As with the system described in FIG. 19, the assay structure 664 has a primary ABM on its bottom and attached to the underlying piece of ceramic tape. However, in the assay described in FIG. 20, the primary ABM is a DNA probe. It is covalently bound to the hydrophobic end of a lipid that is part of a self-assembled monolayer which is, in turn, covalently bound on its hydrophilic end to a mental surface. The DNA probe is complimentary to an analyte polynucleotide strand.

In this particular embodiment, the assay is designed to perform a hybridization assay. It is therefore desirable to include heating element 669 which is attached to reservoir 662. The heating element heats the sample solution, thereby denaturing double stranded DNA. While it is preferred to have heating element 669, it is not necessary. It is possible to heat and denature the sample prior to placing it within reservoir 662.

Once sufficient time has been given for any analyte DNA to anneal to the primary ABM probe, it is rinsed by rinse solution 714 which is stored in reservoir 670. Reservoir 670 has a hydrophobic pump attached to it by means of piston conduit 866. Pump reservoir 678 has a hydrophobic solution 720 having a dissolved carrier species within it. This pump operates in the same way as pump 675. An electric current is applied to piston conduit 866 by electrodes 698 and 700. This works in conjunction with a magnetic field to cause solution 720 to move towards reservoir 670 and act as a piston within conduit 866. This, in turn, pushes rinsing solution 714 down conduit 685 and into assay structure 664. Conduit 685 has a hydrophobic bead 713 to serve as a plug so that rinsing fluid 714 does not leak into assay structure prematurely. As with the hydrophobic plugs in FIG. 19, this plug is not necessary but is preferred. Once rinsing fluid 714 has flushed assay structure 664 of the sample, the electric field generated by electrode 698 and 700 is ceased so as to stop the pumping action.

Rinsing fluid 714 may be comprised of deionized water. Because Lorentz forces are not applied to solution 714 itself, it has no need for a carrier species. This is generally preferred as it does not introduce any compounds that may produce background noise to the structure 664.

Reservoir 672 has solution 712 in which a secondary ABM, in this case a secondary probe, is dissolved. The secondary ABM probe has a carrier species covalently bound to it. Once the rinsing step is completed, electric current is applied to electrodes 702 and 704 to create an electric field through piston conduit 688. Hydrophobic solution 718 has a carrier species dissolved within it and is kept in reservoir 680. An electric field is applied that works conjointly with a magnet to push solution 718 down piston conduit 714 to work as a piston and push solution 712 out of reservoir 672, down conduit 686 and into assay structure 664. Solution 712 may also be comprised of buffers and/or salts and/or chelating agents and other compounds known to those skilled in the art to enhance the hybridization process. Once sufficient quantities of solution 712 have entered assay structure 664, the electric current applied to electrodes 702 and 704 is cased and pumping action stops. As with the other plugs described herein, hydrophobic bead 713 is not necessary but is preferred. This microfluidic assay structure also shows that it is not necessary to have a second bead in the conduit that introduces the secondary ABM.

After sufficient time has been allowed for the secondary ABM to bind to any analyte DNA present, assay structure 664 is again rinsed by rinse solution 714. As with the initial rinse, addition of rinse solution 714 to assay structure 664 is facilitated by applying current to electrodes 698 and 700, thereby actuating a hydrophobic pump. The electric current is ended after assay structure 664 is sufficiently rinsed.

Once excess secondary ABM is removed from assay structure 664, it may be necessary to add an activating agent and activating solution 710. In this particular embodiment, the electroactive species is again alkaline phosphatase. Therefore, PAP must be added to serve as a redox cycling compound to facilitate detection. Activating solution 710, stored in reservoir 674, is pushed by hydrophobic pump solution 716, stored in reservoir 682, when an electrical field is generated by electrodes 706 and 708. Hydrophobic solution 716 moves down pump conduit 690, thereby pushing solution 710 down conduit 687 and into assay structure 664. As with other conduits, hydrophobic bead 711 prevents premature mixing of the activating solutions. Once the activating solution is added, electrodes 724 and 726 are used to measure currents generated by any alkaline phosphatase present.

As with the assay described in FIG. 19, the electroactive complex utilized in the assay described in FIG. 20 may not require an activating agent.

FIGS. 19 and 20 disclose only two of a wide variety of immobilization assays. They are intended to illustrate methods by which immobilization assays may be incorporated into microfluidic systems to quickly, efficiently and easily perform assays on a wide variety of samples and analytes. They may be used in conjunction with each other and may be combined in a variety of ways. One such combination is shown in FIG. 21.

Figure 21:
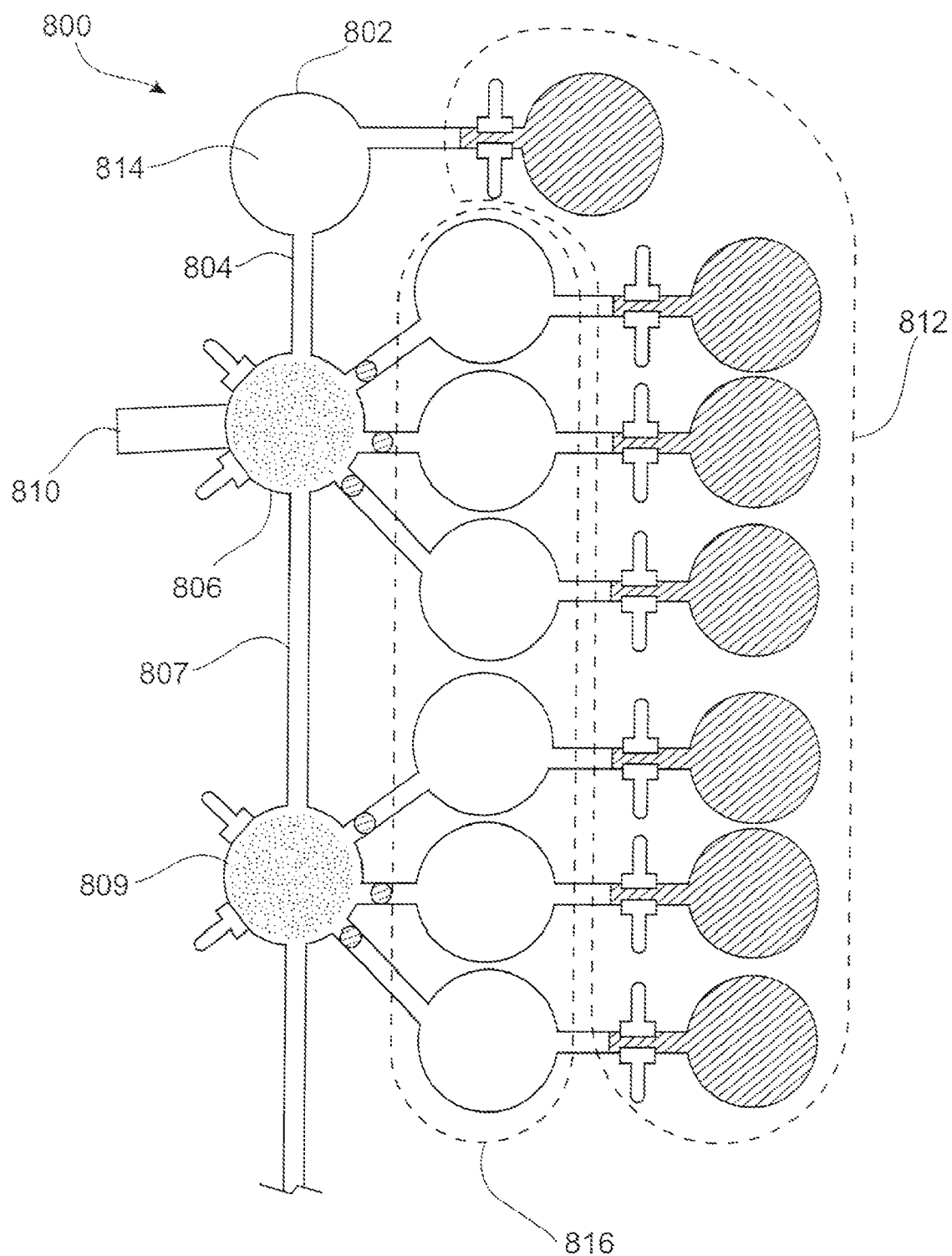
FIG. 21 shows a schematic diagram of an alternative microfluidic assay structure.

FIG. 21 shows a method of performing two assays in sequence using a microfluidic structure. Reservoirs 816 are actuated to deposit solutions into assay structures 806 and 809 by hydrophobic pumps 812 in the same methods described above. Assay structure 806 is designed to perform an ELISA substantially the same as that described above. Assay structure 806 is designed to perform an ELISA substantially the same as that described in FIG. 19. Those skilled in the art will appreciate that the modifications are slight. Assay structure 806 has heating element 810 attached to it. After the ELISA is completed, heating element 810 is actuated in order to heat shock immobilized microorganisms. The heat shock results in release of heat shock mRNAs. The solution in assay structure 806, now including heat shock mRNAs is pumped down conduit 807 and into assay structure 809. Assay structure 809 is substantially the same as that described in FIG. 18. It is used to detect the presence of any heat shock mRNAs. This combination of assays allows a microfluidic chip to rapidly and accurately detect not only the presence but also the viability of the microorganism for which it is testing. As with the assay structures disclosed in FIGS. 17 and 18, the structure disclosed in FIG. 19 may also be used to form an array of similar structures on a chip. Even relatively large assay structures, such as the one disclosed in FIG. 21, take up only a few millimeters on a chip.

Microfluidic assay systems disclosed in FIGS. 17 through 21 are intended to illustrate their use when comprised of ceramic tape. Those skilled in the art will appreciate that similar structures are readily formed by photolithographic methods. In addition, reservoirs and assay structures are all depicted as being circular in shape. Those skilled in the art will appreciate that they may take on any of a variety of forms. Similarly, conduits are all shown to be substantially straight. Those skilled in the art will appreciate that these conduits may be curved. The assay structures have also been shown to exist two dimensionally. Those skilled in the art will appreciate that both ceramic tape chips and photolithographic chips are comprised of several layers. The reservoirs and assay structures may be comprised of one or several layers. In addition, it is not necessary that an assay system in a microfluidic chip have a planar design. In many situations, it may be desirable for the microfluidic assay system to utilize reservoirs from many different layers within a chip. Similarly, conduits may readily be designed to penetrate several layers. Those skilled in the art will appreciate that the microfluidic assay designs schematically depicted in FIGS. 17 through 21 may be readily adapted to a large variety of three dimensional geometries.

For clarity, the magnets used to create the magnetic field are not shown in FIGS. 17 through 21. However, those skilled in the art will appreciate that a magnetic field is readily applied to the structures by placing a pair of magnets about them. One magnet would go above the structure and one below, both being laid at the location corresponding to points where MHD electrodes are placed along conduits.

Whereas, the present invention has been described in relation to the drawings attached hereto, it should be understood that other and further modifications, apart from those shown or suggested herein, may be made within the spirit and scope of this invention.

What is claimed is:

1. A method for constructing a magnetohydrodynamic microfluidic device, comprising the steps of:
    fabricating at least one channel layer using at least one layer of ceramic;
    forming at least two electrodes in at least one channel and substantially perpendicular to said at least one channel;
    forming at least one magnet in said at least one channel and substantially perpendicular to said channel and said electrodes;
    inserting said at least one channel layer between at least two sandwiching layers to form a unitary device;
    forming electrical connectors such that current or voltage can be applied to said electrodes; and
    applying said magnet and said electrodes substantially perpendicular to a solution within said at least one channel causing said solution to flow through said at least one channel.

2. The method for constructing a magnetohydrodynamic microfluidic device according to claim 1 including an additional step of laminating said at least one channel layer between said sandwiching layers.

3. The method for constructing a magnetohydrodynamic microfluidic device according to claim 2 wherein said step of laminating is accomplished by pressure, thermal or adhesive means.

4. The method for constructing a magnetohydrodynamic microfluidic device according to claim 1 wherein said at least one layer of ceramic is a low-temperature, co-fired ceramic material or a high-temperature ceramic material.

5. The method for constructing a magnetohydrodynamic microfluidic device according to claim 1 wherein at least one of said sandwiching layers is ceramic, glass or a polymer.

6. The method for constructing a magnetohydrodynamic microfluidic device according to claim 5 wherein said ceramic of said at least one of said sandwiching layers is a low-temperature, co-fired ceramic material or a high-temperature ceramic material.

7. The method for constructing a magnetohydrodynamic microfluidic device according to claim 1 wherein said step of forming electrical connectors is accomplished by fabricating circuits onto said at least one channel layer such that said circuits allow current or voltage to be applied to said electrodes.

8. The method for constructing a magnetohydrodynamic microfluidic device according to claim 7 wherein said step of fabricating circuits onto said at least one channel layer is by screen printing, thermal deposition, sputter deposition, electron-beam deposition, laser ablation, photolithography, electro-plating or electroless-plating processes.

9. The method for constructing a magnetohydrodynamic microfluidic device according to claim 1 wherein said step of forming electrical connectors is accomplished by fabricating circuits onto at least one of said sandwiching layers such that said circuits allow current or voltage to be applied to said electrodes.

10. The method for constructing a magnetohydrodynamic microfluidic device according to claim 9 wherein said step of fabricating circuits onto said at least one of said sandwiching layers is by screen printing, thermal deposition, sputter deposition, electron-beam deposition, laser ablation, photolithography, electro-plating or electroless-plating processes.

11. The method for constructing a magnetohydrodynamic microfluidic device according to claim 1 wherein said electrodes are fabricated by screen printing, thermal deposition, sputter deposition, electron-beam deposition, laser ablation, photolithography, electro-plating or electroless-plating processes.

12. The method for constructing a magnetohydrodynamic microfluidic device according to claim 1 wherein said electrodes are fabricated into spatially separate bands, disks, rectangles, or other geometric shapes to which electrical current or voltage can be individually applied.

13. The method for constructing a magnetohydrodynamic microfluidic device according to claim 1 wherein said electrodes are fabricated using continuous conductive material or nanoparticulate material.

14. The method for constructing a magnetohydrodynamic microfluidic device according to claim 1 wherein said electrodes are formed using pull-through methods.

15. The method for constructing a magnetohydrodynamic microfluidic device according to claim 1 wherein said electrodes are formed by coating both sides of said at least one channel layer and using pull-through methods.

16. The method for constructing a magnetohydrodynamic microfluidic device according to claim 1 including the additional step of fabricating passive equilibration conducting walls within said at least one channel.

17. The method for constructing a magnetohydrodynamic microfluidic device according to claim 16 wherein said passive equilibration conducting walls are constructed of continuous conductive material or nanoparticulate material.

18. The method for constructing a magnetohydrodynamic microfluidic device according to claim 16 wherein said passive equilibration conducting walls are fabricated by screen printing, thermal deposition, sputter deposition, electron-beam deposition, laser ablation, photolithography, electro-plating or electroless-plating processes.

19. The method for constructing a magnetohydrodynamic microfluidic device according to claim 16 wherein said passive equilibration conducting walls are fabricated into spatially separated bands, disks, rectangles, or other geometric shapes.

20. A magnetohydrodynamic microfluidic device, comprising:
at least one channel layer using at least one layer of ceramic;
at least two electrodes in at least one channel and substantially perpendicular to said at least one channel;
at least one magnet in said at least one channel and substantially perpendicular to said at least one channel and said electrodes;
wherein said at least one channel layer is between at least two sandwiching layers to form a unitary device; and
wherein said electrodes and said magnet induce a solution to flow in a direction substantially perpendicular to both said electrodes and said magnet.

21. The magnetohydrodynamic microfluidic device of claim 20 wherein said at least one channel layer is laminated between said sandwiching layers.

22. The magnetohydrodynamic microfluidic device of claim 21 wherein said lamination of said at least one channel layer between said sandwiching layers is accomplished by pressure, thermal or adhesive means.

23. The magnetohydrodynamic microfluidic device of claim 20 wherein at least one of said sandwiching layers is ceramic, glass, or a polymer.

24. The magnetohydrodynamic microfluidic device of claim 23 wherein said ceramic of said at least one of said sandwiching layers is a low-temperature, co-fired ceramic material or a high-temperature ceramic material.

25. The magnetohydrodynamic microfluidic device of claim 20 wherein said at least one layer of ceramic is a low-temperature, co-fired ceramic material or a high-temperature ceramic material.

26. The magnetohydrodynamic microfluidic device of claim 20 further including electrical connectors wherein said electrical connectors allow current or voltage to be applied to said electrodes.

27. The magnetohydrodynamic microfluidic device of claim 26 wherein said electrical connectors are formed by fabricating circuits onto said at least one channel layer such that said circuits allow current or voltage to be applied to said electrodes.

28. The magnetohydrodynamic microfluidic device of claim 27 wherein said fabrication of said circuits onto said at least one channel layer is by screen printing, thermal deposition, sputter deposition, electron-beam deposition, laser ablation, photolithography, electro-plating or electroless-plating processes.

29. The magnetohydrodynamic microfluidic device of claim 26 wherein said electrical connectors are formed by fabricating circuits onto at least one of said sandwiching layers such that said circuits allow current or voltage to be applied to said electrodes.

30. The magnetohydrodynamic microfluidic device of claim 29 wherein said fabrication of said circuits onto said at least one of said sandwiching layers is by screen printing, thermal deposition, sputter deposition, electron-beam deposition, laser ablation, photolithography, electro-plating or electroless-plating processes.

31. The magnetohydrodynamic microfluidic device of claim 20 wherein said electrodes are in spatially separate bands, disks, rectangles, or other geometric shapes to which electrical current or voltage can be individually applied.

32. The magnetohydrodynamic microfluidic device of claim 20 wherein said electrodes are fabricated by screen printing, thermal deposition, sputter deposition, electron-beam deposition, laser ablation, photolithography, electro-plating or electroless-plating processes.

33. The magnetohydrodynamic microfluidic device of claim 20 wherein said electrodes are constructed of continuous conductive material or nanoparticulate material.

34. The magnetohydrodynamic microfluidic device of claim 20 wherein said electrodes are formed using pull-through methods.

35. The magnetohydrodynamic microfluidic device of claim 20 wherein said electrodes are formed by coating both sides of said at least one channel layer and using pull-through methods.

36. The magnetohydrodynamic microfluidic device of claim 20 further including passive equilibration conducting walls within said at least one channel.

37. The magnetohydrodynamic microfluidic device of claim 36 wherein said passive equilibration conducting walls are constructed of continuous conductive or nanoparticulate materials.

38. The magnetohydrodynamic microfluidic device of claim 36 wherein said passive equilibration conducting walls are in spatially separate bands, disks, rectangles, or other geometric shapes.

39. The magnetohydrodynamic microfluidic device of claim 36 wherein said passive equilibration conducting walls are fabricated by screen printing, thermal deposition, sputter deposition, electron-beam deposition, laser ablation, photolithography, electro-plating or electroless-plating processes.

* * * * *